(12) United States Patent
Ode

(10) Patent No.: US 10,057,894 B2
(45) Date of Patent: Aug. 21, 2018

(54) BASE STATION, TERMINAL, AND COMMUNICATION SYSTEM

(71) Applicant: FUJITSU LIMITED, Kawasaki-shi, Kanagawa (JP)

(72) Inventor: Takayoshi Ode, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 189 days.

(21) Appl. No.: 14/862,688

(22) Filed: Sep. 23, 2015

(65) Prior Publication Data

US 2016/0014746 A1 Jan. 14, 2016

Related U.S. Application Data

(63) Continuation of application No. PCT/JP2013/059762, filed on Mar. 29, 2013.

(51) Int. Cl.
*H04W 72/04* (2009.01)
*H04L 5/00* (2006.01)

(52) U.S. Cl.
CPC ............ *H04W 72/042* (2013.01); *H04L 5/00* (2013.01); *H04L 5/001* (2013.01); *H04L 5/0032* (2013.01);
(Continued)

(58) Field of Classification Search
None
See application file for complete search history.

(56) References Cited

U.S. PATENT DOCUMENTS 9,344,985 B2 * 5/2016 Loehr ............... H04W 56/0005
2012/0087257 A1 * 4/2012 Larsson ................. H04L 5/001
370/252
(Continued)

FOREIGN PATENT DOCUMENTS

JP 2011-019074 1/2011
JP 2011-176687 9/2011
(Continued)

OTHER PUBLICATIONS

3GPP TS 36.211 V10.5.0 (Jun. 2012), 3rd Generation Partnership Project; Technical Specification Group Radio Access Network; Evolved Universal Terrestrial Radio Access (E-UTRA); "Physical Channels and Modulation (Release 10)" (101 pages).
(Continued)

*Primary Examiner* — Kouroush Mohebbi
(74) *Attorney, Agent, or Firm* — Fujitsu Patent Center

(57) ABSTRACT

A communication system includes: a first base station; one or more second base stations; and a terminal. The first base station includes an acquiring unit that acquires information about reception time, at which the terminal receives information sent from the first base station and the one or more second base stations by using one or more frequency bands or transmission time of each frequency band at the terminal or both, and a first control unit that controls, based on information about the reception time or the transmission time acquired by the acquiring unit, frequency bands that are simultaneously used by the terminal. The terminal includes a second control unit that performs control, in accordance with the control performed by the first base station, such that communication is performed by simultaneously using the frequency bands.

10 Claims, 28 Drawing Sheets

(52) U.S. Cl.
CPC ..... *H04W 72/048* (2013.01); *H04W 72/0453* (2013.01)

(56) References Cited

U.S. PATENT DOCUMENTS

| | | |
|---|---|---|
| 2012/0157101 A1 | 6/2012 | Uemura et al. |
| 2012/0257519 A1* | 10/2012 | Frank .................... H04L 5/0035 370/252 |
| 2012/0327821 A1 | 12/2012 | Lin et al. |

FOREIGN PATENT DOCUMENTS

| | | |
|---|---|---|
| JP | 2011-205242 | 10/2011 |
| WO | 2011124259 | 10/2011 |
| WO | 2012119626 | 9/2012 |

OTHER PUBLICATIONS

3GPP TS 36.213 V10.6.0 (Jun. 2012), 3rd Generation Partnership Project; Technical Specification Group Radio Access Network; Evolved Universal Terrestrial Radio Access (E-UTRA); "Physical Layer Procedures (Release 10)" (125 pages).

3GPP TS 36.214 V10.1.0 (Mar. 2011), 3rd Generation Partnership Project; Technical Specification Group Radio Access Network; Evolved Universal Terrestrial Radio Access (E-UTRA); "Physical Layer Measurements (Release 10)" (13 pages).

3GPP TS 36.321 V10.5.0 (Mar. 2012), 3rd Generation Partnership Project; Technical Specification Group Radio Access Network; Evolved Universal Terrestrial Radio Access (E-UTRA); "Medium Access Control (MAC) protocol specification (Release 10)" (54 pages).

3GPP TS 36.331 V10.6.0 (Jun. 2012), 3rd Generation Partnership Project; Technical Specification Group Radio Access Network; Evolved Universal Terrestrial Radio Access (E-UTRA); "Radio Resource Control (RRC); Protocol Specification (Release 10)" (302 pages).

3GPP TS 36.300 V10.8.0 (Jun. 2012), 3rd Generation Partnership Project; Technical Specification Group Radio Access Network; Evolved Universal Terrestrial Radio Access (E-UTRA) and Evolved Universal Terrestrial Radio Access Network (E-UTRAN); "Overall description; Stage 2 (Release 10)" (194 pages).

International Search Report and Written Opinion of the International Searching Authority (Form PCT/ISA/210, Form PCT/ISA/237), mailed in connection with PCT/JP2013/059762 dated Jun. 4, 2013 (11 pages).

* cited by examiner

| UPLINK-DOWNLINK CONFIGURA-TION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG.8

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | - | - | - |
| 8 | $24144 \cdot T_s$ | | | - | - | - |

FIG.9

| configuration | | | | | | | | | | | | | |
|---|---|---|---|---|---|---|---|---|---|---|---|---|---|
| #0 | Dw | Dw | Dw | gap | gap | gap | gap | gap | gap | gap | gap | gap | Up |
| #1 | Dw | Dw | Dw | Dw | Dw | Dw | Dw | Dw | Dw | gap | gap | gap | Up |
| #2 | Dw | Dw | Dw | Dw | Dw | Dw | Dw | Dw | Dw | gap | gap | gap | Up |
| #3 | Dw | Dw | Dw | Dw | Dw | Dw | Dw | Dw | Dw | Dw | gap | gap | Up |
| #4 | Dw | Dw | Dw | Dw | Dw | Dw | Dw | Dw | Dw | Dw | Dw | gap | Up |
| #5 | Dw | Dw | Dw | gap | gap | gap | gap | gap | gap | gap | gap | Up | Up |
| #6 | Dw | Dw | Dw | Dw | Dw | Dw | Dw | Dw | gap | gap | gap | Up | Up |
| #7 | Dw | Dw | Dw | Dw | Dw | Dw | Dw | Dw | gap | gap | Up | Up | Up |
| #8 | Dw | Dw | Dw | Dw | Dw | Dw | Dw | Dw | Dw | gap | Up | Up | Up |

BASE STATION, TERMINAL, AND COMMUNICATION SYSTEM

CROSS-REFERENCE TO RELATED APPLICATION

This application is a continuation application of International Application No. PCT/JP2013/059762, filed on Mar. 29, 2013 and designating the U.S., the entire contents of which are incorporated herein by reference.

FIELD

The embodiments discussed herein are related to a base station, a terminal, and a communication system.

BACKGROUND

To increase the bandwidth, studies have been conducted on communication that uses a plurality of frequency bands. With this technology, the use efficiency of the frequency and the transmission rate can be improved. For example, in the $3^{rd}$ Generation Partnership Project Radio Access Network Long Term Evolution (3GPP LTE)-Advanced that is the communication standard, the technology called Carrier Aggregation (CA) are being studied. The Carrier Aggregation is a communication technology that uses a plurality of component carriers. In other words, the Carrier Aggregation is a technology that may perform communication by simultaneously using different frequency bands. A component carrier mentioned here means a unit of frequency bands that can be used for the communication. There are Patent Documents 1 to 3 as documents that propose a technology related to wireless communication that uses the plurality of frequency bands described above.

Patent Document 1: Japanese Laid-open Patent Publication No. 2011-019074
Patent Document 2: Japanese Laid-open Patent Publication No. 2011-205242
Patent Document 3: Japanese Laid-open Patent Publication No. 2011-176687
Non-Patent Document 1: 3GPP TS36.211 V10.5.0 "Physical channels and modulation (Release 10)"
Non-Patent Document 2: 3GPP TS36.213 V10.6.0 "Physical layer procedures (Release 10)"
Non-Patent Document 3: 3GPP TS36.214 V10.1.0 "Physical layer Measurements (Release 10)"
Non-Patent Document 4: 3GPP TS36.321 V10.5.0 "Medium Access Control (MAC) (Release 10)"
Non-Patent Document 5: 3GPP TS36.331 V10.6.0 "Radio Resource Control (RRC) (Release 10)"
Non-Patent Document 6: 3GPP TS36.300 V10.8.0 "Overall description; Stage 2 (Release 10)"

In radio waves transmitted from wireless communication devices, a frequency component (spurious component) that is not intended at the time of design may be sometimes included. Therefore, in a wireless communication device that uses a plurality of frequency bands, when transmission is performed by using a certain frequency band and reception is performed by using another frequency band, there may be a case in which, depending on the relationship between the transmission timing and the reception timing in the wireless communication device, a spurious component of a transmission wave in the certain frequency band possibly degrades the reception quality of the other frequency band. For example, if the spurious component of the transmission wave in the certain frequency band interferes with the other frequency band (reception bandwidth) that is used for the reception, the signal-to-interference ratio (SIR) indicating the ratio of signal electrical power to interference power, the signal-to-noise ratio (SNR) indicating the ratio of signal electrical power to noise electrical power, or the like in the reception bandwidth is degraded and thus possibly resulting in degradation of the bit error rate (BER), throughput, or the like. Furthermore, the degradation of the reception quality described above may possibly occur in a terminal and a base station.

According to an aspect of the present invention, if communication is performed by a terminal and a base station that can perform communication by simultaneously using a plurality of frequency bands, based on information about reception time or transmission time of each of the frequency bands in the terminal, the frequency bands that are simultaneously used by the terminal are selected and controlled. This solution can be used for various devices, such as terminal devices, base station devices, higher-level devices, and the like, unless otherwise noted.

SUMMARY

According to an aspect of the embodiments, a communication system includes: a first base station; one or more second base stations; and a terminal. The first base station includes an acquiring unit that acquires information about reception time, at which the terminal receives information sent from the first base station and the one or more second base stations by using one or more frequency bands or transmission time of each frequency band at the terminal or both, and a first control unit that controls, based on information about the reception time or the transmission time acquired by the acquiring unit, frequency bands that are simultaneously used by the terminal. The terminal includes a second control unit that performs control, in accordance with the control performed by the first base station, such that communication is performed by simultaneously using the frequency bands.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a schematic diagram illustrating an example of a plurality of Special Frame (SF) patterns;

FIG. 9 is a schematic diagram illustrating a plurality of SF pattern candidates represented by units of symbols;

DESCRIPTION OF EMBODIMENTS

Figure 1:
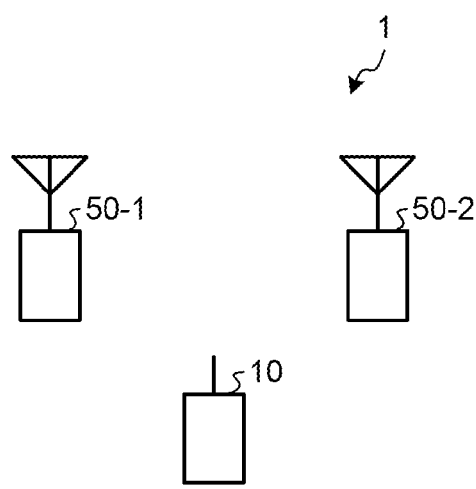
FIG. 1 is a schematic diagram illustrating an example of a communication system according to a first embodiment.

Preferred embodiments will be explained with reference to accompanying drawings. The base station, the terminal, and the communication system disclosed in the present invention are not limited to the embodiments. Furthermore, in the embodiments described below, components having the same function are assigned the same reference numerals and descriptions of overlapped portions will be omitted. Furthermore, in the embodiments, processing steps at each of which the same process is performed are assigned the same reference numerals and descriptions of overlapped portions will be omitted.

Furthermore, because of the distance between a base station and a terminal, it takes time for a radio wave to reach the reception side from the transmission side. For example, a time difference occurs between a transmission timing (or transmission time) at the base station and a reception timing (or reception time) at the terminal. In the present invention, for convenience of description, this time difference is referred to as a propagation delay.

Furthermore, in order to simplify the description, hereinafter, a description will be given by indicating the transmission from a terminal to a base station as an uplink (or uplink transmission) and indicating the transmission from the base station to the terminal as a downlink (or downlink transmission). Furthermore, an uplink may sometimes be referred to as a forward link) and a downlink may sometimes be referred to as a reverse link. Furthermore, a description will be given by indicating a wireless channel (radio channel) as a channel.

[a] First Embodiment

Outline of a Communication System

FIG. 1 is a schematic diagram illustrating an example of a communication system according to a first embodiment. In a description below, to simplify the description, unless otherwise noted, the names of the communication system technology, each device, and information, such as control information, and the system configuration are described in accordance with a LTE system and a LTE-Advanced system; however, the meaning thereof is not limited to these names. Namely, even if the names and the configurations are different from those described in the embodiments, they can be considered as the same as long as the essence thereof is not different from those described in the embodiments. Furthermore, the present invention can also be used in a communication system other than the LTE and LTE-Advanced systems.

In FIG. 1, a communication system 1 includes a terminal 10 and base stations 50-1 and 2. In FIG. 1, for the sake of convenience, only a single terminal 10 and only the base stations 50-1 and 2 are illustrated. Namely, the number of the terminals 10 and the number of the base stations 50 are not limited thereto. In a description below, the base station 50, which will be described later, that is associated with a first cell, i.e., the base station 50 that is being connected, may sometimes be referred to as the base station 50-1 and the base station 50 that is different from the base station 50-1 may sometimes be referred to as a base station 50-X. There may also be a case in which only the single base station 50-X is present or there may also be a case in which a plurality of the base stations 50-X are present. Furthermore, both the base station 50-1 and the base station 50-X may sometimes be collectively referred to as the base station 50 as long as the base station 50-1 and the base station 50-X need not be distinguished. Furthermore, the plurality of the base stations 50 may also be connected to a higher-level station by wired connection or may also be connected each other via the higher-level station. Alternatively, the plurality of the base stations 50 may also directly be connected by wired connection logically or physically. Furthermore, the base stations 50 may also be, for example, base stations, femto base stations, or small-size base stations that use a radio remote header (RRH) in the LTE system.

In the communication system 1, the terminal 10 performs communication in a cell combination in which an uplink transmission timing (transmission time) and a downlink reception timing (reception time) do not overlap. Namely, the terminal 10 performs communication by using "Carrier Aggregation". The Carrier Aggregation is performed in order to satisfy, for example, a transmission speed needed for the terminal 10. The "cell" mentioned here is an area (hereinafter, referred to as a "communication area") in which communication is performed by using a single "channel band". The "channel band" is determined based on the channel bandwidth and the center frequency and is sometimes referred to a component carrier in LTE-Advanced. Furthermore, the "communication area" may also be the entire area in which the radio wave sent from the base station can reach or may also be a division area, i.e., a sector, obtained by dividing the communication area into multiple areas. Furthermore, the "channel band" is sometimes referred to as a "system band". Hereinafter, a component carrier may sometimes be referred to as a "CC". Furthermore, Carrier Aggregation may sometimes be referred to as "CA".

Furthermore, the base station may sometimes be defined to be formed by a single frequency band and a single communication area. Namely, there may be a case in which a cell, a base station, and a channel band become synonymous. In contrast, there may be a case in which a base station has a plurality of frequency bands or a plurality of communication areas and a case in which a base station has communication areas with respect to the plurality of the frequency bands and with respect to each of the frequency bands. Namely, there may be a case in which a cell and a channel band become synonymous. In a description below, a description will be given of a case in which a base station has a plurality of frequency bands; however, unless otherwise noted, the embodiments of the present invention can also be used in a case in which a base station has a single frequency band and a single communication area or a case in which a base station has a plurality of communication areas.

For example, first, the terminal 10 starts communication by using a first cell and then, by adding a second cell in addition to the first cell that is in communication, performs communication using a plurality of cells.

For example, the base station 50-1 that is associated with the first cell acquires, from the terminal 10, a first propagation delay occurring in the first cell and a second propagation delay occurring in a plurality of second cells associated with each of the base station 50-1 or the base station 50-X or acquires, from the terminal 10, a propagation delay difference between the first propagation delay and the second propagation delay. In the following, as an example, a description will be given with the assumption that the base station 50-1 acquires the propagation delay difference between the first propagation delay and the second propagation delay from the terminal 10.

The base station 50-1 associated with the first cell generates, based on the propagation delay difference between the first propagation delay and the second propagation delay, a control signal that is used to notify the terminal 10 of an "addition cell" that is included in each of a plurality of the second cells and that is used with the first cell at the time of communication. The base station 50-1 sends this control signal to the terminal 10 by using the first cell. Furthermore, the cell associated with the base station 50-1 may also be excluded from the plurality of the second cells or the cell associated with the base station 50-1 may also be included in the plurality of the second cells. In the following, as an example, a description will be given of a case in which the cell associated with the base station 50-1 is excluded from the plurality of the second cells.

The terminal 10 receives the control signal sent from the base station 50-1 that is associated with the first cell. The terminal 10 performs communication by using the first cell and the addition cell that is notified by the control signal.

As described above, because the terminal 10 complies with the control signal that is generated based on the propagation delay difference between the first propagation delay and the second propagation delay in the base station 50-1, communication can be performed by using a plurality of cells in which the uplink transmission timing and the downlink reception timing do not overlap with each other. Consequently, it is possible to prevent degradation of the reception quality due to spurious of a transmission wave.

In the following, a technology that is used in the communication system 1 will be described.

Carrier Aggregation

In the communication system 1, in both the uplink channel and the downlink channel, the bandwidth of each CC can be set to one of 1.4 MHz, 3 MHz, 5 MHz, 10 MHz, 15 MHz, and 20 MHz.

Figure 2:
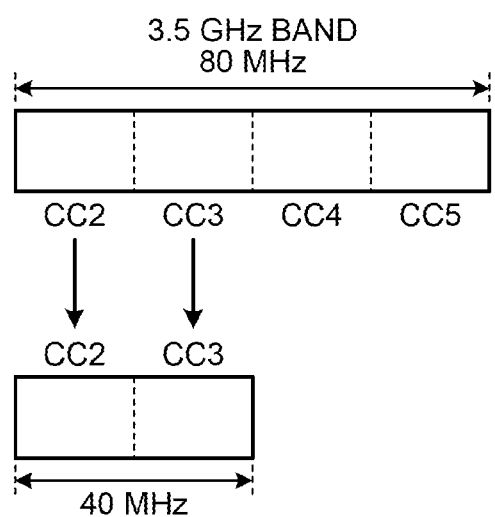
FIG. 2 is a schematic diagram illustrating an example of a state in which component carriers are aggregated by using Carrier Aggregation.
Figure 3:
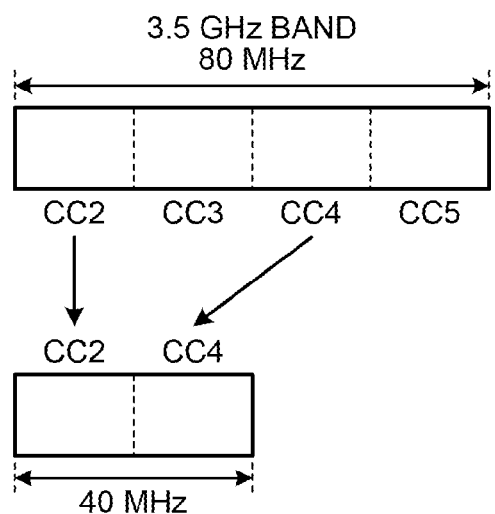
FIG. 3 is a schematic diagram illustrating an example of a state in which component carriers are aggregated by using Carrier Aggregation.
Figure 4:
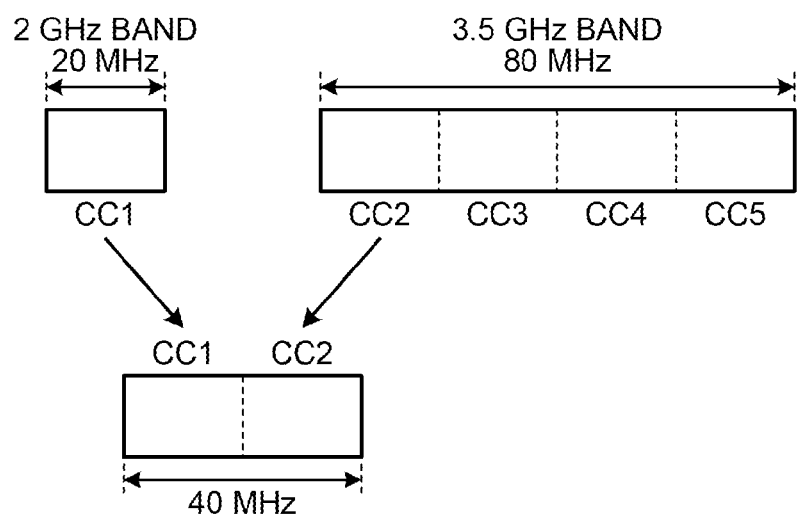
FIG. 4 is a schematic diagram illustrating an example of a state in which component carriers are aggregated by using Carrier Aggregation.

The Carrier Aggregation is a technology in which two or more CCs are aggregated and the aggregated multiple CCs are used for communication performed by the single terminal 10. The following three examples can be listed as an aspect of aggregating the plurality of CCs. FIGS. 2, 3, and 4 are schematic diagrams each illustrating an example of a state in which component carriers are aggregated by using Carrier Aggregation. Furthermore, in FIGS. 2, 3, and 4, 80 MHz in the band of 3.5 GHz and 20 MHz in the band of 2 GHz are referred to as an "operating band". This operating band is a band that can be used in the system. The drawing is only an example and a band of 800 MHz, 1.5 GHz, or the like may also be used. Furthermore, a bandwidth may also be 40 MHz, 100 MHz, or the like. In the LTE system and the LTE-Advanced system, operating band is prescribed as the E-UTRA frequency band in, for example, TS36.104.

(Aspect 1) In a same operating band, a plurality of CCs that are contiguous in the frequency direction is aggregated.

For example, as illustrated in FIG. 2, in the band of 3.5 GHz, the CCs 2 and 3 that are contiguous in the frequency direction are aggregated.

(Aspect 2) In a same operating band, a plurality of CCs that are non-contiguous in the frequency direction is aggregated. For example, as illustrated in FIG. 3, the CCs 2 and 4 that are non-contiguous in the frequency direction in the band of 3.5 GHz are aggregated.

(Aspect 3) A plurality of CCs belonging to different operating bands is aggregated. For example, as illustrated in FIG. 4, the CC 1 in the band of 2 GHz is aggregated with the CC 2 in the band of 3.5 GHz.

Furthermore, for a plurality of CCs aggregated by means of Carrier Aggregation, CCs may also be in the same base station 50 or may also be in the different base stations 50. Namely, according to the Carrier Aggregation, a plurality of cells with different CCs (i.e., frequencies) can be used for communication.

Control of Carrier Aggregation

In the following, a control method of Carrier Aggregation will be described.

When CA is performed, first, a cell (hereinafter, sometimes be referred to as a primary cell, a P-Cell, a first cell, a main band, a first band, or a first base station) associated with a first CC that is the main CC is set. Then, with respect to the P-Cell, a cell (hereinafter, sometimes be referred to as a secondary cell, a S-Cell, a second cell, an expansion band, a second band, or a second base station) associated with a second CC that is different from the first CC is aggregated. Here, the number of candidate CCs for the S-Cell can be set up to a maximum of 7. At least one S-Cell is set from among a candidate CC group of these S-Cells and CA between the P-Cell and the S-Cell is performed. For example, if the system band is 100 MHz and the bandwidth of a CC is 20 MHz, CA can be performed by using a maximum of five CCs formed of a single P-Cell and four S-Cells. The primary cell is sometimes referred to as an anchor component because the primary cell functions as the reference in CA.

Here, as described above, the terminal 10 can connect to only a single cell at the time of wireless channel setting. Because of this, the cell that is connected at the time of wireless channel setting serves as the P-Cell. Furthermore, thereafter, when a handover or the like is performed, the P-Cell is changed. Furthermore, the S-Cell can also be added, deleted, or changed.

In the following, setting of an S-Cell will be described.

First, when the base station 50-1 sets a wireless channel with the terminal 10, the base station 50-1 notifies the terminal 10 of the list (information), as control information, of the base station 50 that can be connected. For example, in the LTE-Advanced system, the base station 50-1 sends a serving cell index information element (ServCellIndex IE) that is a control signal of the layer 3 (L3) to the terminal 10 and sets a maximum of eight cell candidates. At this time, ServCellIndex=0 indicates the candidate for the P-Cell and ServCellIndex=1-7 indicates the candidates for the S-Cells. Namely, the base station 50-1 notifies the terminal 10 of the list of the base stations 50, in which connection is possible, as the first cell and the second cells. The name "serving cell" is originated from a nature of a cell that supplies user data (so-called general data).

Furthermore, the ServCellIndex IE is included in a CrossCarrierSchedulingConfig IE. The CrossCarrierSchedulingConfig IE is included in a PhysicalConfigDedicated IE and, furthermore, the PhysicalConfigDedicated IE is included in a RadioResourceConfigDedicated IE. The RadioResourceConfigDedicated IE is included in an RRCConnectionReconfiguration message. Namely, this means that the information on the base station 50 in which connection is possible may also be sent to the terminal 10 as a notification together with another piece of control information.

Then, from among the set S-Cell candidates, one or more S-Cells that are actually used for CA are selected. The terminal 10 is notified of the selected S-Cells by using the ServCellIndex IE. The ServCellIndex IE is included in an RRCConnectionReconfiguration message and is sent from the base station 50 to the terminal 10 as a notification.

Furthermore, as described above, in CA, because the associated base station 50 can use a plurality of different cells, the associated base station 50 may also include different cells in the plurality of cells that are set by the ServCellIndex IE.

Control of Uplink Transmission Timing

In the communication system 1, when communication is performed between the terminal 10 and the base station 50, for example, in an uplink, Single Carrier Frequency Division Multiple Access (SC-FDMA) and Discrete Fourier Transform-Spread-Orthogonal Frequency Division Multiplexing (DFT-S-OFDM) or Discrete Fourier Transform-Spread-Orthogonal Frequency Division Multiplexing (DFT-S-OFDMA) is used. Namely, communication is performed between the terminal 10 and the base station 50 by using a plurality of subcarriers that are orthogonal each other. Furthermore, the subcarriers may also be used for communication that is performed at the same time by a plurality of the terminals 10. In this case, by performing a Fourier transformation process on a plurality of subcarriers received at the same time or received within a predetermined time period, the base station 50 performs a receiving process. However, because the propagation distance between each of the terminals 10 and the base station 50 differs, in order for the base station 50 to receive, at the same time or within a predetermined time period, a signal sent from each of the terminals 10, the transmission timing of each of the terminals 10 is preferably controlled.

Thus, based on the reception timing of a signal that is sent between the base station 50 and each of the terminals 10, the base station 50 generates a control signal, i.e., a Timing Advanced command (TA command), of the transmission timing of each of the terminals 10. The TA command mentioned here is a command that is used by the base station 50 to control the transmission timing of each of the terminal 10 such that, when a transmission wave sent from each of the terminals 10 managed by the base station 50 is received by the base station 50, the reception timing of each of the transmission waves matches. Then, the base station 50 sends the TA commands generated for the respective terminals 10 to the terminals 10 and then each of the terminals 10 controls the transmission timing based on the received TA command. Namely, the TA command is an example of information about the transmission time at each of the terminals 10.

Here, the TA command is sent from the base station 50 to the terminal 10 as a control signal of, for example, the layer 2 (L2).

Furthermore, the TA command is sent from the base station 50 to the terminal 10 at the time of a random access procedure that is performed when a wireless channel is set between the base station 50 and the terminal 10 as a first transmission period. As a second transmission period, the TA command is sent from the base station 50 to the terminal 10 together with data transmission even after the completion of the setting of the wireless channel after the completion of the random access procedure. Namely, the TA command that is sent in the second transmission period is used to adjust the transmission timing for a cell that is being connected.

Figures 5, 6:
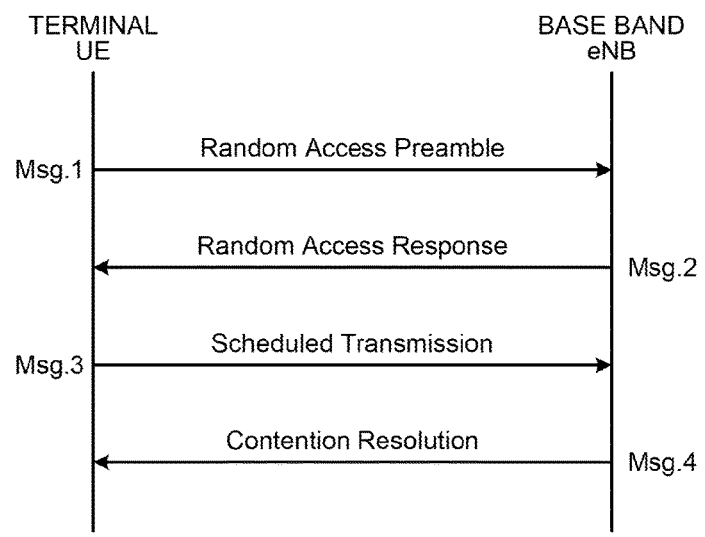
FIG. 5 is a schematic diagram illustrating an example of a random access procedure.
FIG. 6 is a schematic diagram illustrating an example of a plurality of frame patterns of Time Division Duplex (TDD)

The first transmission period of the TA command is sent by being included in a random access response (Message (Msg.) 2)) that is sent from the base station 50 to the terminal 10 at the time of, for example, the random access procedure. The value of the TA command in the first transmission period is calculated, by the base station 50 that has received a random access preamble (RAP) at the time of the random access procedure, based on the reception timing of the RAP at the base station 50. This random access response is a response to the random access preamble (Message (Msg.) 1)) sent from the terminal 10 to the base station 50. FIG. 5 is a schematic diagram illustrating an example of a random access procedure. The random access is designed such that, even if a signal is not sent at the correct transmission timing, the random access does not interfere with the other terminal 10 and the base station 50 other than the device that has sent that signal. Consequently, by using the random access, it is possible to adjust the transmission timing in the terminal 10.

Then, the TA command that is sent in the first transmission period is a control signal with 11 bits. Namely, the value of the TA command (hereinafter, sometimes be referred to as a "TA value") can be the value of 0 to 1282. Furthermore, the value of 1 TA is 16 Ts. The symbol represented by Ts is a symbol period. Accordingly, the value $N_{TA}$ obtained by converting the TA value to the symbol can be represented by $N_{TA}=16 \times T_A$. The symbol represented by $T_A$ indicates a TA value. Because Ts is 1/30720 [ms], the maximum value of the TA value corresponds to 666.7 [μs]. Furthermore, in a case of a Normal Cyclic Prefix (CP), 7 symbols are 0.5 ms. Furthermore, the length of the Normal CP is 180 Ts or 144 Ts and the symbol length excluding the CP is 2048 Ts. Furthermore, each of the CPs after the second symbol and the subsequent symbols is 144 Ts. The maximum value of a TA value can be obtained as follows.

16×1282/(2048+144)=9.36 [symbol]

Namely, the maximum value of the TA value corresponds to about 9 symbols.

In contrast, the TA command that is sent in the second transmission period is a control signal with 6 bits. Namely, the TA value can be a value of 0 to 63. This TA command is included in, for example, a MAC Control Element together with data transmission and is then sent. However, the TA command that is sent in the second transmission period indicates an adjustment value as the reference of the TA command that was immediately previously sent. Namely, the value $N_{TA}$ obtained by converting the TA value of the second transmission period to a symbol satisfies the following equation. Furthermore, MAC indicates Medium (or Media) Access Control and is a higher layer of the physical layer in which a baseband process, such as modulation, demodulation, coding, decoding, or the like, is performed.

$N_{TA,new}=N_{TA,old}+(T_A-31)\times 16$

Namely, the TA value varies in the range of −496 Ts to +496 Ts based on the immediately previous value. Namely, the TA value varies in the range of −16 [μs] to +16 [μs] based on the immediately previous value.

Example Configuration of a Frame

In the communication system 1, Time Division Duplex (TDD) can be used. In this case, in each cell, a plurality of TDD frame patterns are used as candidate and a single "TDD frame pattern" is selected and used. FIG. 6 is a schematic diagram illustrating an example of a plurality of TDD frame patterns. FIG. 6 illustrates seven TDD frame patterns indicated by the identification number of 0 to 6. Each of the TDD frame patterns includes a single frame, i.e., 10 subframes. Furthermore, in each of the TDD frame patterns, the subframe associated with "D" is a downlink channel period and the subframe associated with "U" is an uplink channel period. Furthermore, the subframe associated with "S" is a special subframe. The special subframe mentioned here is a subframe that is arranged between a downlink subframe and an uplink subframe when a change from the downlink subframe to the uplink subframe occurs.

Figure 7:
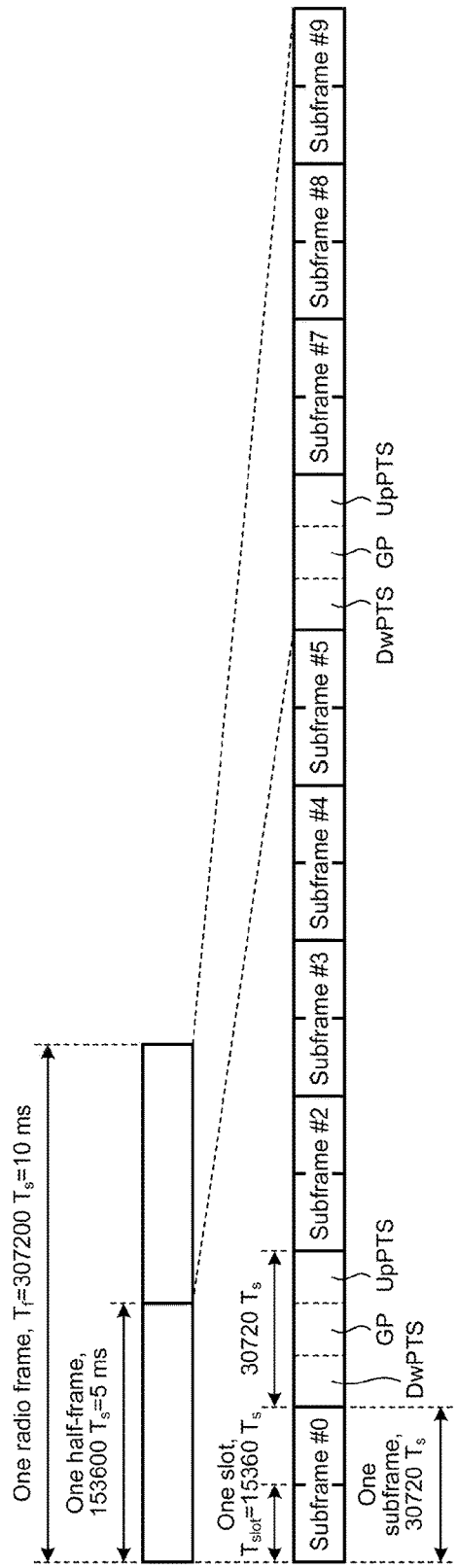
FIG. 7 is a schematic diagram illustrating an example of the configuration of a TDD frame pattern.

For example, the TDD frame pattern with the identification number of 2 illustrated in FIG. 6 becomes the TDD frame pattern illustrated in FIG. 7. FIG. 7 is a schematic diagram illustrating an example of the configuration of a TDD frame pattern. As illustrated in FIG. 7, the special subframe includes a "downlink slot (DwPTS: Downlink Pilot Time Slot)", a "gap section (GP: Guard Period)", and an "uplink slot (UpPTS: Uplink Pilot Time Slot)" in the order they are listed in this sentence. The gap section is a non-transmission section in which transmission is not performed. Furthermore, in a special subframe, a plurality of patterns (hereinafter, sometimes be referred to as an "SF pattern") is present. FIG. 8 is a schematic diagram illustrating an example of a plurality of SF patterns. FIG. 9 is a schematic diagram illustrating a plurality of SF patterns represented by units of symbols. Namely, each cell in each of the SF patterns illustrated in FIG. 9 corresponds to a single symbol. Namely, in FIG. 9, the symbol associated with "Dw" forms a downlink slot and the symbol associated with "Up" forms an uplink slot. Furthermore, the symbol associated with "gap" is a protection (buffer) section of a downlink (downlink transmission or a forward link) and an uplink (uplink transmission or a reverse link) and forms a non-transmission section.

Here, if a same TDD frame pattern is used for each of the cells that are used in CA, it is assumed that an uplink channel period and a downlink channel period do not overlap among the cells. However, if a propagation delay between the terminal 10 and the base station 50 differs among the cells, the downlink reception timing in one cell may possibly overlap with the uplink transmission timing in the other cell. Consequently, there is a possibility that the reception quality may be decreased due to a spurious component of a transmission wave. In other words, there is a possibility that a spurious component of a transmission wave interferes with a reception wave, an SIR is degraded, and thus the reception quality is decreased.

Figure 10:
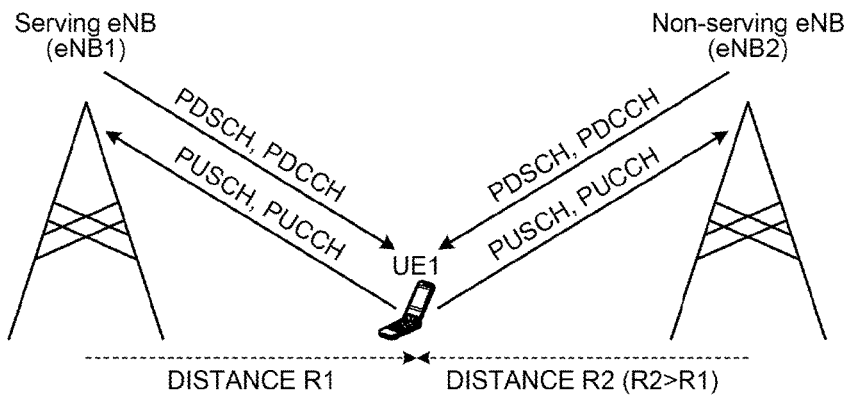
FIG. 10 is a schematic diagram illustrating a state in which a downlink reception timing and a downlink transmission timing overlap between two cells.
Figure 11:
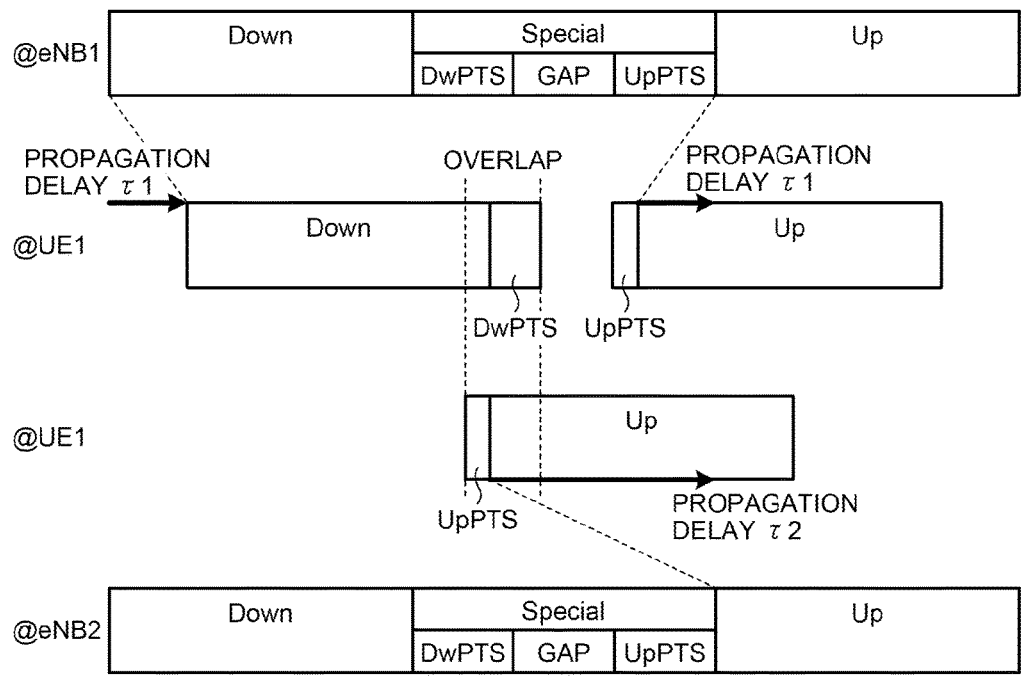
FIG. 11 is a schematic diagram illustrating a state in which a downlink reception timing and a downlink transmission timing overlap between two cells.

FIGS. 10 and 11 are schematic diagrams each illustrating a state in which a downlink reception timing and a uplink transmission timing overlap between two cells. In FIGS. 10 and 11, the base station 50-1 that is associated with one of the two cells is represented by an eNB 1 and the base station 50-X that is associated with the other one of the cells is represented by eNB 2. The terminal 10 is represented by a UE 1. The eNB stands for an evolutional Node B, i.e., a base station. The UE is User Equipment and means a terminal. The PDCCH illustrated in FIG. 10 is a physical downlink control channel that is used to send control information as a notification from the base station 50 to the terminal 10. The PDSCH is a physical downlink shared channel that is used to send data from the base station 50 to the terminal 10. The PUCCH is a physical uplink control channel that is used to send control information as a notification from the terminal 10 to the base station 50. The PUSCH is a physical uplink shared channel that is used to send data from the terminal 10 to the base station 50.

Because the eNB 1 is separated from the UE 1, it takes time for a radio wave to reach the UE 1 from the eNB 1. The time is called a propagation delay. Furthermore, the distance between the UE 1 and the eNB 1 is different from the distance between the UE 1 and the eNB 2, the propagation delay τ1 between the UE 1 and the eNB 1 and the propagation delay τ2 between the UE 1 and the eNB 2 differ. In a case of TDD, it can be assumed that, in both the uplink and the downlink, both the propagation delays between the UE 1 and the eNB 1 are τ1 and it can be assumed that, in both the uplink and the downlink, both the propagation delays between the UE 1 and the eNB 2 are τ2.

Accordingly, as illustrated in FIG. 11, the downlink reception period of the UE 1 is delayed by τ1 from the downlink transmission period of the eNB 1. Furthermore, in order for the signal sent from the UE 1 to arrive within the uplink reception period of the eNB 1, the uplink transmission period of the UE 1 is advanced by τ1 from the uplink reception period of the eNB 1. Similarly, in order for the signal sent from the UE 1 to arrive within the uplink reception period of the eNB 2, the uplink transmission period of the UE 1 is advanced by τ2 from the uplink reception period of the eNB 2. Namely, for the UE 1, the eNB 1 controls the uplink transmission timing associated with τ1 by using a TA command. In contrast, for the UE 1, the eNB 2 controls the uplink transmission timing associated with τ2 by using a TA command. Here, if it is assumed that the eNB 1 and eNB 2 are synchronized with an accuracy of a certain level or more, the downlink reception period for which the UE 1 receives a signal sent from the eNB 1 may possibly overlap with the uplink transmission period for which the UE 1 sends a signal to the eNB 2, depending on the length of the difference between τ1 and τ2 and the length of the gap section included in a special subframe, as illustrated in FIG. 11. In other words, the downlink reception timing of one of the cells may possibly overlap with the downlink transmission timing of the other cell.

For example, it is assumed that the TDD frame pattern that is used for two cells is the TDD frame pattern with the identification number of 1 (i.e., configuration #1). Furthermore, it is assumed that τ1 is 9760 Ts and the TA value is 1235. Furthermore, it is assumed that the TA value sent from the eNB 2 to the UE 1 is the maximum value of 1282. This value of 1282 corresponds to 20512 Ts. Furthermore, it is assumed that the SF pattern that is used for the two cells is the SF pattern with the identification number of 0. Furthermore, it is assumed that the eNB 1 and the eNB 2 are synchronized with an accuracy of, for example, 1/10 of Ts or less. Namely, it is assumed that the synchronization is performed with an accuracy that causes no problem for the subsequent processes. Furthermore, based on the timing of the eNB 1 and the eNB 2, uplink transmission timing and the downlink reception timing of the UE 1 will be described. If a description will be given with the assumption described above, before the subframe #3, the UpPTS having 2192 Ts and the GAP and the DwPTS having 8768 Ts are sequentially present in this order. Namely, the DwPTS is started at the time point before the sum total of 10960 Ts from the top of the subframe #3. Then, the UE 1 performs a downlink reception for 9760 Ts after the end of the subframe #1. Namely, the UE 1 performs a downlink reception until the UE 1 reaches the DwPTS of the subframe #2 of the eNB 1. In contrast, the UE 1 starts uplink transmission before 20512 Ts from the top of the subframe #3. Namely, the UE 1 starts uplink transmission from the DwPTS of the subframe #2 of the eNB 2. Consequently, in the UE 1, the uplink transmission timing and downlink reception timing overlap each other. Even if CA is performed in this state, the reception characteristic of one of the two cells is degraded and thus the improvement of a transmission speed is not expected. Furthermore, even for a case of using a plurality of cells in the single base station 50, there may be a case in which the uplink transmission timing in one cell overlaps with the downlink reception timing of the other cell. The reason for this is, because the characteristic of reflection, diffraction, or the like differs if the frequency differs, a propagation paths are not the same if the frequency differs (in particular, in a case in which the operating bandwidth differs).

In contrast, in the communication system 1, the terminal 10 performs communication by using a combination of cells in which the uplink transmission timing does not overlap with the downlink reception timing. Consequently, because communication can be performed by using a plurality of cells in which the uplink transmission timing does not overlap with the downlink reception timing in the terminal 10, it is possible to prevent degradation of the reception quality due to spurious of a transmission wave.

Configuration Example of the Base Station

Figure 12:
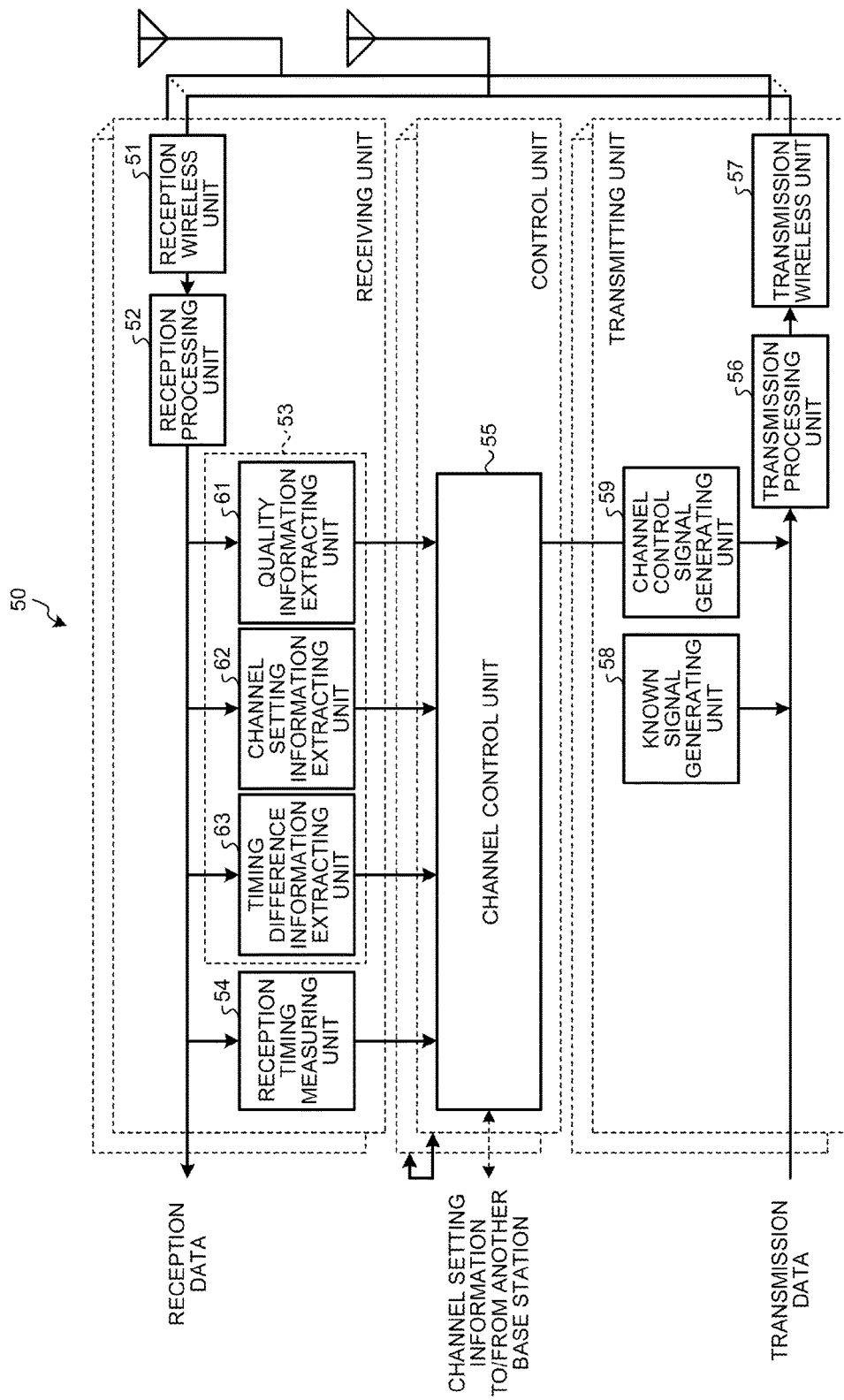
FIG. 12 is a functional block diagram illustrating an example of a base station according to the first embodiment.

FIG. 12 is a functional block diagram illustrating an example of a base station according to the first embodiment. In FIG. 12, the base station 50 includes a reception wireless unit 51, a reception processing unit 52, an acquiring unit 53, a reception timing measuring unit 54, a channel control unit 55, a transmission processing unit 56, a transmission wireless unit 57, a known signal generating unit 58, and a channel control signal generating unit 59. Here, the reception wireless unit 51, the reception processing unit 52, the acquiring unit 53, and the reception timing measuring unit 54 may also be used as a receiving unit; the channel control unit 55 may also be used as a control unit; and the transmission processing unit 56, the transmission wireless unit 57, the known signal generating unit 58, and the channel control signal generating unit 59 may also be used as a transmitting unit.

Furthermore, depending on an aspect of Carrier Aggregation, although not illustrated in FIG. 12, a plurality of a part or all of the transmitting unit and the receiving unit may also be provided. For example, if the frequency bands belonging to at least two different frequency bands are aggregated, a plurality of transmitting units and receiving units associated with the frequency bands to be used may also be provided.

Furthermore, as illustrated in FIG. 12, the base station 50 may also include a plurality of sets of the receiving units, the control units, and the transmitting units described above and each of the sets may also be associated with each of the cells.

Furthermore, in the configuration example of the base station 50 described below, a description will be mainly given of a case in which the base station 50 is the base station 50-1 that is associated with the first cell.

The reception wireless unit 51 performs a predetermined wireless receiving process, i.e., down-conversion, analog digital conversion, or the like, on the signal received via an antenna and then outputs the signal to the reception processing unit 52.

The reception processing unit 52 performs a demodulation process and a decoding process on the reception signal received from the reception wireless unit 51 and then outputs the obtained reception data.

The acquiring unit 53 extracts, from the reception data output from the reception processing unit 52, wireless channel quality (channel quality) information, channel setting (channel setup) information, and timing difference information. The acquiring unit 53 outputs the extracted wireless channel quality information, the channel setting information, and the timing difference information to the channel control unit 55. The wireless channel quality mentioned here is the reception quality of a known signal (for example, a pilot signal or a reference signal (RS)) and is, for example, one of a signal to interference ratio (SIR), a signal to noise ratio (SNR), received power (or reception field intensity), known signal received power (for example: pilot received power (PSRP: Pilot Signal Received Power), reference signal received power (RSRP), known signal reception quality (for example, pilot signal reception quality (PSRQ: Pilot Signal Received Quality), reference signal reception quality (RSRQ: Reference Signal Received Quality)), and the like. Furthermore, wireless channel quality index (CQI: Channel Quality Indicator) or the like that is calculated based on the SIR may also be used. The channel setting information mentioned here is control information needed for the channel setting and is formed by, for example, the bandwidth of the frequency that is used; control information about a wireless channel, such as a cell ID or the like; and control information about a channel connection, such as a random access or the like. Furthermore, the timing difference information corresponds to information about the reception time in the general meaning. The known signal is a signal that is previously determined in the transmitting device and the receiving device and that can be distinguished from other signals. In particular, in the receiving device, because the known signal can be recognized as the signal to be received, by comparing the known signal with the actually received signal, it is possible to identify an interference signal.

For example, the acquiring unit 53 includes a quality information extracting unit 61, a channel setting extracting unit (channel setting information extracting unit) 62, and a timing difference information extracting unit 63. Then, the wireless channel quality information is extracted by the quality information extracting unit 61, the channel setting information is extracted by the channel setting extracting unit 62, and the timing difference information is extracted by the timing difference information extracting unit 63.

The reception timing measuring unit 54 measures the reception timing of the known signal sent from the terminal 10 and outputs information about the measured reception timing to the channel control unit 55. The known signal mentioned here is a signal that is previously notified, a signal that can be calculated based on previously notified information, or a signal that can be identified at the transmission source and the reception destination. The information about this reception timing is used, in the channel control unit 55, to create a TA command that is used to control the transmission timing of the terminal 10.

The channel control unit 55 generates, based on the timing difference information, a control signal that is used to notify the terminal 10 of an addition cell that is used together with a first cell that is in communication with the terminal 10. In this control signal, the channel control unit 55 includes channel setting information received from the base station 50-X that is associated with the addition cell. Here, the timing difference information mentioned here indicates a reception timing difference, in the terminal 10, between a known signal sent in the first cell from the base station 50-1 to the terminal 10 and a measurement target frequency that is different from the frequency (i.e., CC) that is associated with the first cell, i.e., a known signal that was received, for the second cell, by the terminal 10. This reception timing difference corresponds to a difference between the first propagation delay in the first cell and the second propagation delay in the second cell, i.e., a propagation delay difference. Furthermore, in the timing difference information, the identification information on the second cell associated with the subject timing difference information and the identification information on the base station 50-X associated with the second cell are added.

For example, if the channel control unit 55 receives timing difference information about a plurality of the second cells, the channel control unit 55 selects, as addition cell candidates, the cells in which the timing difference indicated by the timing difference information is equal to or less than the first threshold. Furthermore, the channel control unit 55 sets the first threshold to a value in accordance with the length of the gap section of the SF pattern that is commonly set in the first cell and the second cells. Furthermore, it is assumed that a common TDD frame pattern is used in the first cell and the second cell.

Furthermore, based on the wireless channel quality information, the channel control unit 55 selects an addition cell from among one or a plurality of selected addition cell candidates. For example, the channel control unit 55 selects, from among the addition cell candidates, an addition cell in which the quality indicated by the associated wireless channel quality information is the highest. The channel control unit 55 includes the information about the selected addition cell in the control signal and sends the control signal to the terminal 10. Furthermore, the channel control unit 55 may also notify the terminal 10 of the information about the selected addition cell as channel setting information.

Here, as a first step, the addition cell candidate is selected based on the timing difference and, as a second step, the addition cell is selected based on the wireless channel quality; however, the method is not limited thereto. Conversely, as the first step, the addition cell candidate may also be selected based on the wireless channel quality and, as the second step, an addition cell may also be selected based on the timing difference. Alternatively, an addition cell may also directly be selected based on the timing difference. In this case, for example, a second cell having the smallest timing difference may also be used as the addition cell or a second cell in which a timing difference is firstly determined to be equal to or less than the first threshold may also be used as the addition cell.

Figure 13:
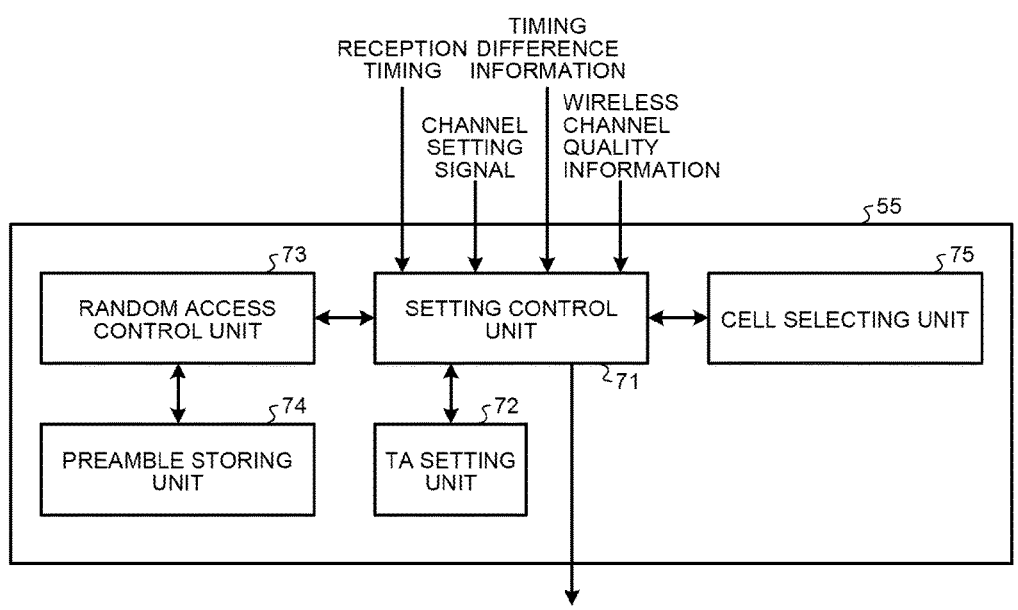
FIG. 13 is a functional block diagram illustrating an example of a channel control unit according to the first embodiment.

FIG. 13 is a functional block diagram illustrating an example of a channel control unit according to the first embodiment. In FIG. 13, the channel control unit 55 includes a setting control unit 71, a TA setting unit 72, a random access control unit 73, a preamble storing unit 74, and a cell selecting unit 75.

The setting control unit 71 mainly controls the TA setting unit 72, the random access control unit 73, and the cell selecting unit 75.

For example, the setting control unit 71 outputs the reception timing received from the reception timing measuring unit 54 to the TA setting unit 72 and allows the TA setting unit 72 to create control information that is used to adjust the transmission timing of the terminal 10 associated with that reception timing, i.e., a TA command. Then, the setting control unit 71 receives the TA command from the TA setting unit 72.

Furthermore, the setting control unit 71 outputs the received timing difference information and the wireless channel quality information to the cell selecting unit 75 and allows the cell selecting unit 75 to select an addition cell. Then, the setting control unit 71 receives information about the addition cell from the cell selecting unit 75.

Furthermore, when the setting control unit 71 sets a channel between the terminal 10 in the cell of the base station 50-1 that is used from now, the setting control unit 71 allows the random access control unit 73 to control the random access procedure with respect to the terminal 10. The preamble storing unit 74 stores therein preamble candidates that are used when the base station 50-1 and the terminal 10 perform the random access procedure. The preamble mentioned here is identification information for identifying the terminal 10 that is used when a random access is performed. For example, 64 preambles are set as candidates and, before a random access is performed, the preambles are notified or reported as channel control information to the terminal 10. Furthermore, two types of preambles are set: preambles that are freely used by the terminal 10 and preambles that are only used by the terminal 10, in a predetermined period, selected by the base station 50-1. For the former type of preambles, because the terminal 10 selects a preamble, a plurality of the terminals 10 may possibly select the same preamble. Namely, collision (contention) may possibly occur. The latter type of preambles are particularly referred to as dedicated preambles and, because only the notified terminal 10 can use a dedicated preamble, collision does not occur. Furthermore, the preamble storing unit 74 in the base station 50-X stores therein preamble candidates that are used when the base station 50-X and the terminal 10 perform the random access procedure.

Then, the setting control unit 71 outputs, to the channel control signal generating unit 59, the TA command, information about the addition cell, and information to be sent to the terminal 10 in the random access procedure. Furthermore, if the addition cell is associated with the base station 50-X, the setting control unit 71 in the base station 50-1 requests channel setting information from the base station 50-X associated with the addition cell and acquires the channel setting information about the addition cell. Namely, the base station 50-1 requests the channel setting information from the base station 50-X associated with the addition cell and acquires the channel setting information from the base station 50-X. Then, the setting control unit 71 outputs the channel setting information acquired from the base station 50-X that is associated with the addition cell to the channel control signal generating unit 59.

The cell selecting unit 75 selects, as the first step, an addition cell candidate based on the timing difference and selects, as the second step, an addition cell based on the wireless channel quality. As described above, as the first step, an addition cell candidate may also be selected based on the wireless channel quality and, as the second step, an addition cell may also be selected based on a timing difference. Alternatively, an addition cell may also directly be selected based on the timing difference.

A description will be given here by referring back to FIG. 12. The known signal generating unit 58 generates a known signal, for example, a pilot (or a reference signal RS, hereinafter, referred to as a pilot) and outputs the known signal to the transmission processing unit 56. For this pilot, a cell common pilot (Cell Specific Pilot) that is commonly used in a cell, a dedicated pilot that is individually allocated to the terminal 10, a positioning pilot that is used for location measurement, or a pilot (Channel State Information Pilot) that is used to measure the wireless channel quality may also be used. Furthermore, the pilot is used for demodulation or wireless channel estimation (channel estimation) that is performed at the time of demodulation or the pilot is used to measure the wireless channel quality. In the former case, the pilot may sometimes be referred to as a demodulation pilot.

The channel control signal generating unit 59 generates a control signal that includes each piece of information received from the setting control unit 71 and then outputs the created control signal to the transmission processing unit 56.

The transmission processing unit 56 performs a coding process and a modulation process on the control signal received from the channel control unit 55, maps the control signal on the downlink channel resource, and generates a transmission signal addressed to the terminal 10. The transmission processing unit 56 sends the generated transmission signal via the transmission wireless unit 57 and the antenna.

The transmission wireless unit 57 performs a predetermined wireless transmission process, i.e., digital analog conversion, up-conversion, or the like, on the transmission signal received from the transmission processing unit 56 and then sends the transmission signal via the antenna.

Configuration Example of the Terminal

Figure 14:
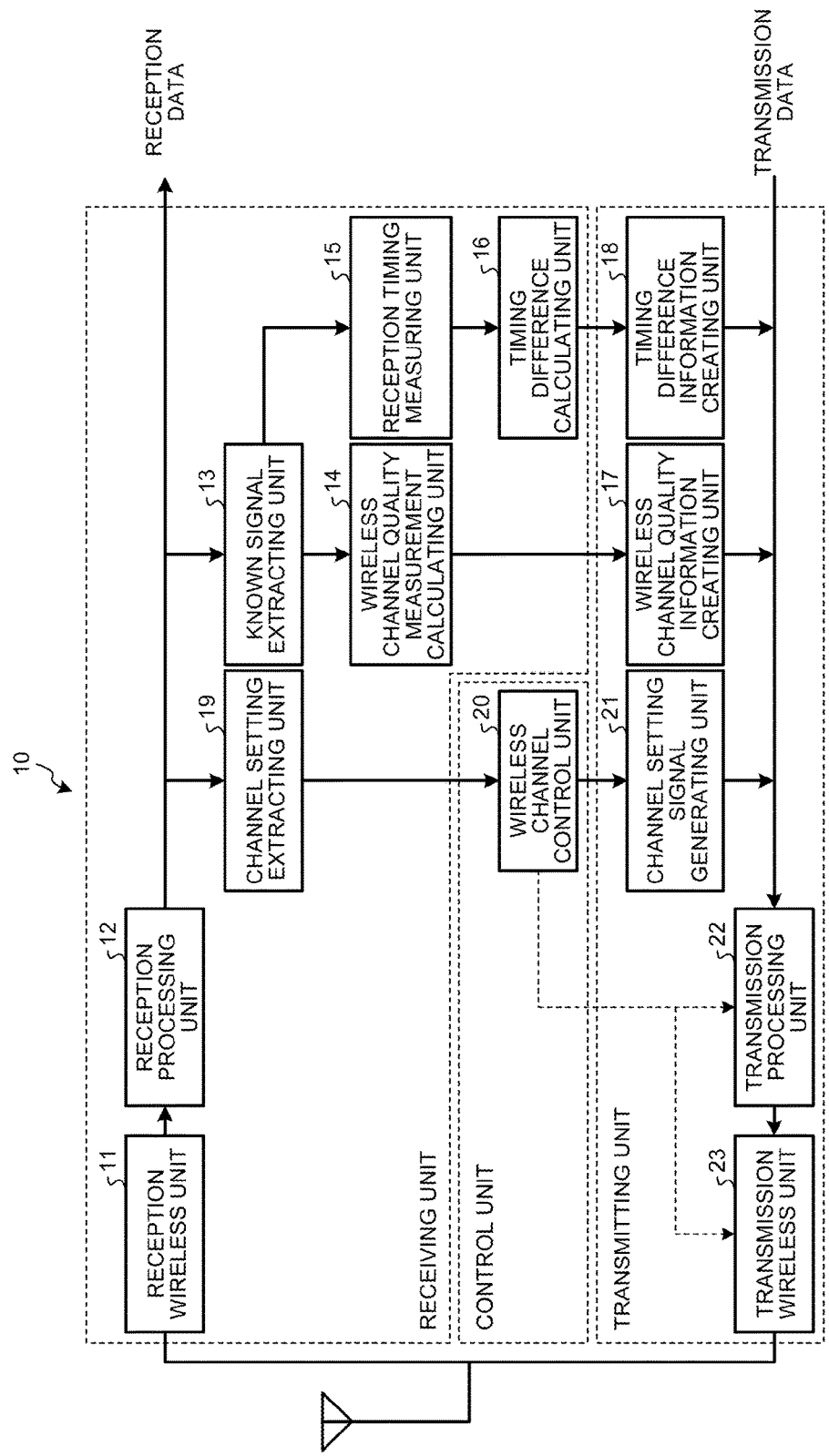
FIG. 14 is a functional block diagram illustrating an example of a terminal according to the first embodiment.

FIG. 14 is a functional block diagram illustrating an example of a terminal according to the first embodiment. In FIG. 14, the terminal 10 includes a reception wireless unit 11, a reception processing unit 12, a known signal extracting unit 13, a wireless channel quality measurement calculating unit 14, a reception timing measuring unit 15, a timing difference calculating unit 16, a wireless channel quality information creating unit 17, and a timing difference information creating unit 18. Furthermore, the terminal 10 includes a channel setting extracting unit 19, a wireless channel control unit 20, a channel setting signal generating unit 21, a transmission processing unit 22, and a transmission wireless unit 23. Here, the reception wireless unit 11, the reception processing unit 12, the known signal extracting unit 13, the wireless channel quality measurement calculating unit 14, the reception timing measuring unit 15, the timing difference calculating unit 16, and the channel setting extracting unit 19 may also be used as a receiving unit. Furthermore, the wireless channel control unit 20 may also be used as a control unit. The wireless channel quality information creating unit 17, the timing difference information creating unit 18, the channel setting signal generating unit 21, the transmission processing unit 22, and the transmission wireless unit 23 may also be used as a transmitting unit.

Furthermore, depending on an aspect of Carrier Aggregation, although not illustrated in FIG. 14, a plurality of a part or all of the transmitting unit and the receiving unit may also be provided. For example, if the frequency bands belonging to at least two different frequency bands are aggregated, a plurality of transmitting units and receiving units associated with the frequency bands to be used may also be provided.

The reception wireless unit 11 performs a predetermined wireless receiving process, i.e., down-conversion, analog digital conversion, or the like, on the signal received via an antenna and then outputs the signal to the reception processing unit 12. Furthermore, the reception wireless unit 11 receives the signal at a target frequency, i.e., the signal in which a target CC is set.

The reception processing unit 12 performs a demodulation process and a decoding process on the reception signal received from the reception wireless unit 11 and then outputs the obtained reception data.

The known signal extracting unit 13 extracts a known signal (for example, a pilot) from the reception data and outputs the extracted known signal to the wireless channel quality measurement calculating unit 14 and the reception timing measuring unit 15.

The wireless channel quality measurement calculating unit 14 calculates the wireless channel quality based on the known signal (for example, a pilot) received from the known signal extracting unit 13. The calculation of the wireless channel quality is performed for each of a first cell that is in communication and the measurement target frequency that is different from the frequency (i.e., a CC) associated with the first cell, i.e., a second cell. The wireless channel quality measurement calculating unit 14 outputs the calculated wireless channel quality to the wireless channel quality information creating unit 17. The SIR, the SNR, received power (or reception field intensity), known signal received power (for example: pilot received power (PSRP: Pilot Signal Received Power), known signal reception quality (for example, pilot signal reception quality (PSRQ: Pilot Signal Received Quality), wireless channel quality index, or the like may be used as the wireless channel quality.

The reception timing measuring unit 15 measures the reception timing based on the known signal (for example, a pilot) received from the known signal extracting unit 13. The measurement of this reception timing is performed for each of the first cell that is in communication and the measurement target frequency that is different from the frequency (i.e., a CC) associated with the first cell, i.e., the second cell. The reception timing measuring unit 15 outputs the measured reception timing to the timing difference calculating unit 16. The reception timing mentioned here is the reception timing of a known signal that is previously determined to be allocated to, for example, a specific symbol in a specific subframe. Furthermore, the reception timing is the reception timing of a subframe in which a known signal is included or the reception timing of the first symbol in a frame. The known signal mentioned here is, for example, a pilot, a synchronization signal, or the like. For example, in the LTE system, a first synchronization signal (PSS: Primary Synchronization Signal) and a second synchronization signal (SSS: Secondary Synchronization Signal) are used. Furthermore, the first synchronization signal (PSS) used in LTE in which TDD is used is arranged in a third symbol from the top of the subframe #1 and the subframe #6. The first synchronization signal (PSS) used in LTE in which Frequency Division Duplex (FDD) is used is arranged in the last symbol in the first slot in the subframe #0 and the subframe #10. Furthermore, a pilot used in LTE is arranged in, for example, the first symbol or a second symbol in each subframe. The arrangement of the pilot in the first symbol or the second symbol differs in accordance with an antenna used for transmission. The reception timing described above may also be indicated by the absolute time or the reception timing of each of the second cells may also be indicated based on the reception timing in the first cell.

The timing difference calculating unit 16 calculates a difference between the reception timing in the first cell and the reception timing of each of the second cells and then outputs the information about the calculated different to the timing difference information creating unit 18.

The wireless channel quality information creating unit 17 converts the channel quality (for example, an SIR) calculated by the wireless channel quality measurement calculating unit 14 to discrete value (for example, Channel Quality Indicator (CQI)) and outputs the discrete value as the wireless channel quality information to the transmission processing unit 22. Furthermore, the wireless channel quality information creating unit 17 may also output, as the wireless channel quality information to the transmission processing unit 22, the wireless channel quality itself calculated by the wireless channel quality measurement calculating unit 14 without converting the calculated quality to the discrete value. Furthermore, the wireless channel quality that is calculated for each cell may also individually be sent to the base station 50-1 or may also collectively be sent to the base station 50-1.

The timing difference information creating unit 18 obtains the remainder obtained by dividing reception timing difference calculated by the timing difference calculating unit 16 by the length of time of the subframe. Namely, the timing difference information creating unit 18 obtains a modulo based on both the reception timing difference calculated by the timing difference calculating unit 16 and the subframe time. The timing difference information creating unit 18 outputs the obtained remainder as the timing difference information to the transmission processing unit 22. Furthermore, the wireless channel quality information and the timing difference information described above may also separately be sent to the base station 50-1 or may also collectively be sent to the base station 50-1.

The channel setting extracting unit 19 extracts, from the reception data sent from the base station 50-1, the channel setting information that is used in the random access procedure and then outputs the extracted channel setting information to the wireless channel control unit 20.

Furthermore, the channel setting extracting unit 19 extracts the channel setting information, such as the dedicated preambles, the bandwidth, or the like, sent from the base station 50-1 and then outputs the extracted channel setting information to the wireless channel control unit 20.

The wireless channel control unit 20 performs, by using the channel setting information sent from the base station 50-1, control such that a random access preamble is sent by the addition cell and performs the random access procedure between the terminal and base station 50-X associated with the addition cell. Thereafter, furthermore, the wireless channel control unit 20 performs channel setting with the base station 50-X associated with the addition cell. Furthermore, the wireless channel control unit 20 allows the channel setting signal generating unit 21 to generate channel setting information, such as a response message or the like with respect to the channel setting information sent from the base station 50-1. Namely, the wireless channel control unit 20 performs the random access procedure with the base station 50-X that is associated with the addition cell.

The channel setting signal generating unit 21 outputs, to the transmission processing unit 22, the channel setting information, such as a message that is sent to the base station 50-X in the random access procedure.

The transmission processing unit 22 performs the coding process and the modulation process on the information received from the wireless channel quality information creating unit 17, the timing difference information creating unit 18, and the channel setting signal generating unit 21; maps the information onto the uplink resource; and generates a transmission signal addressed to the base station. The transmission processing unit 22 sends the generated transmission signal via the transmission wireless unit 23 and the antenna.

The transmission wireless unit 23 performs a predetermined wireless transmission process, i.e., digital analog conversion, up-conversion, or the like, on the transmission signal received from the transmission processing unit 22 and sends the transmission signal via the antenna.

Operation of the Base Station and the Terminal

A description will be given of the operation of a process performed by the base station 50-1 and the terminal 10 having the configuration described above.

Figure 15:
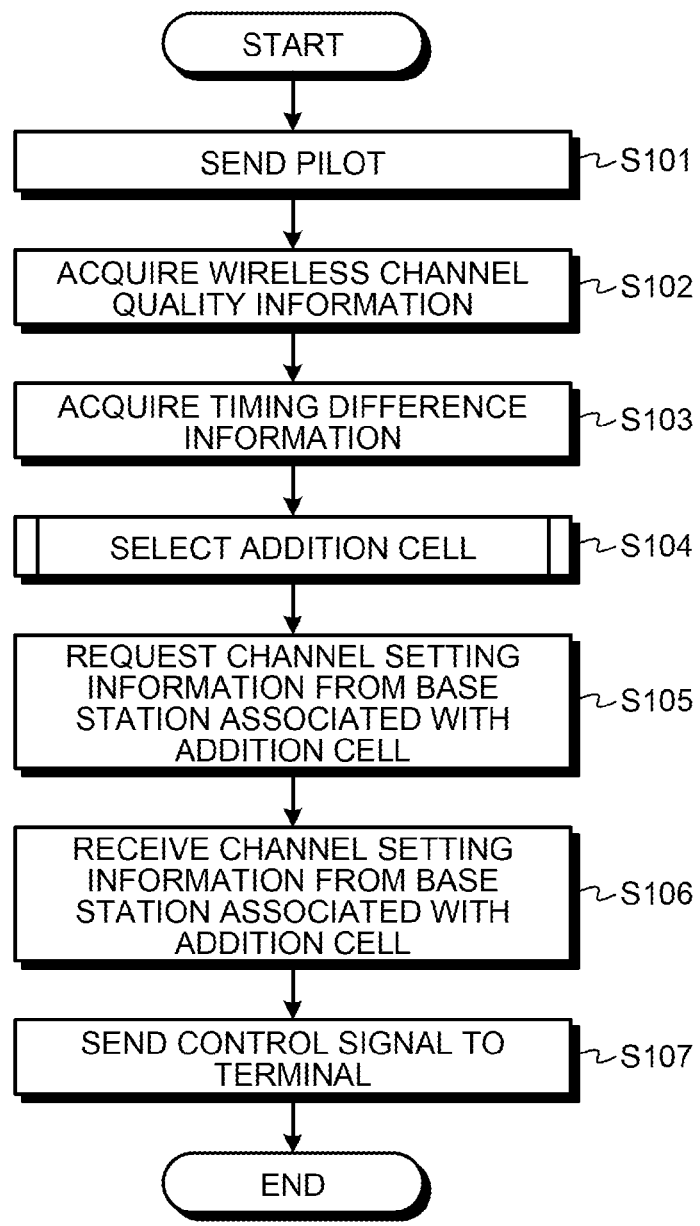
FIG. 15 is a flowchart illustrating an example of the operation of a process performed by a base station according to the first embodiment.

FIG. 15 is a flowchart illustrating an example of the operation of a process performed by a base station according to the first embodiment.

The base station 50-1 sends the known signal (for example, a pilot) generated by the known signal generating unit 58 to the terminal 10 (Step S101).

The base station 50-1 acquires, by the acquiring unit 53, the wireless channel quality information sent from the terminal 10 (Step S102).

The base station 50-1 acquires, by the acquiring unit 53, the timing difference information sent from the terminal 10 (Step S103).

The base station 50-1 performs a process of selecting an addition cell at the channel control unit 55 (Step S104).

Figure 16:
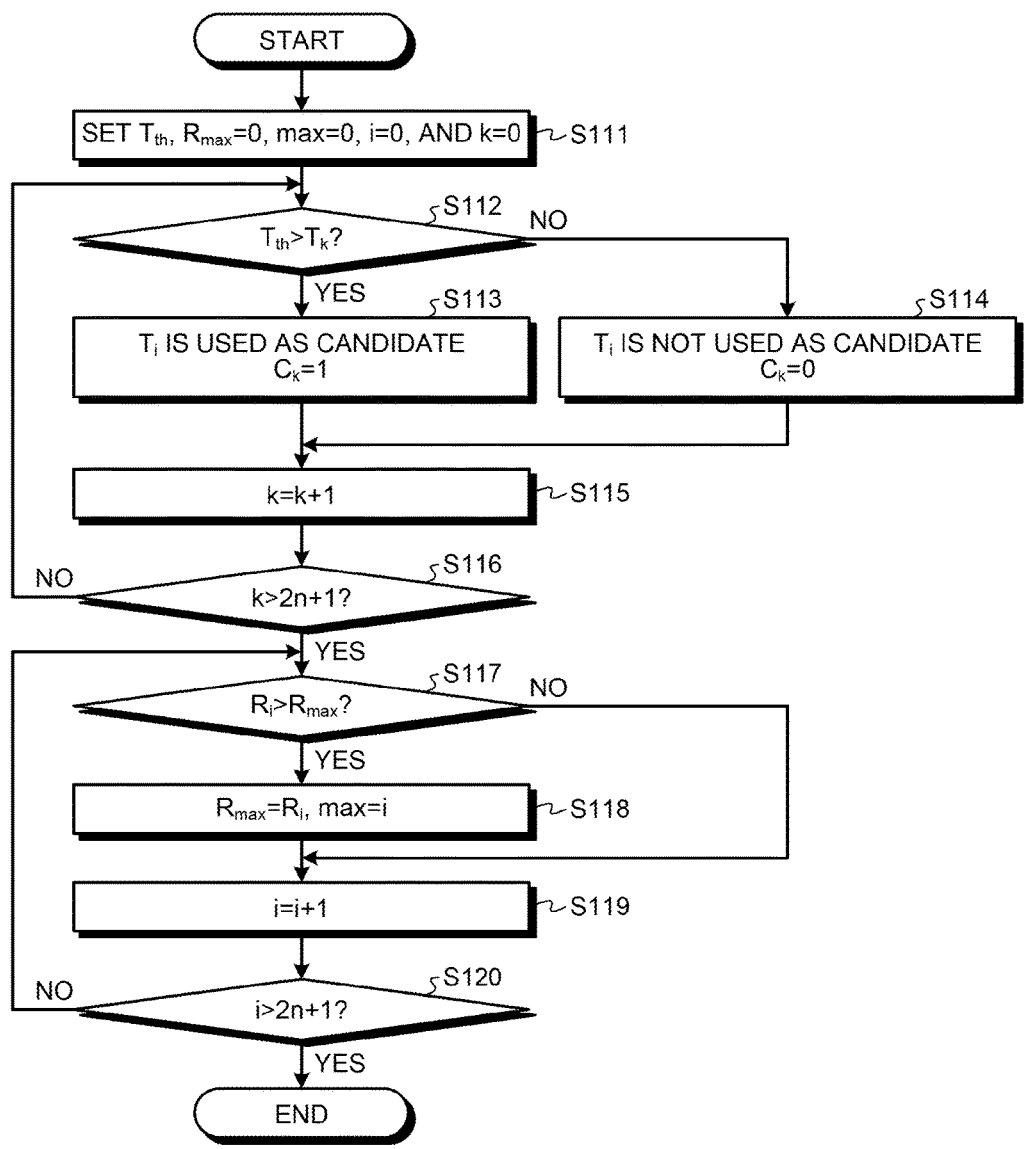
FIG. 16 is a flowchart illustrating an example of a process of selecting an addition cell according to the first embodiment.

FIG. 16 is a flowchart illustrating an example of a process of selecting an addition cell according to the first embodiment.

First, at step in which the process of selecting an addition cell is started, pieces of the wireless channel quality information $R_1$ to $R_{2n}$ and pieces of the timing difference information $T_1$ to $T_{2n}$ related to the plurality of the second cells are received by the base station 50-1.

The channel control unit 55 sets the initial value of each of the first threshold $T_{th}$, the maximum value $R_{max}$ of the received power, i, and k (Step S111). The initial values of $R_{max}$, max, i, and k are zero.

Then, the channel control unit 55 selects, from among the pieces of the timing difference information $T_1$ to $T_{2n}$, pieces of timing time difference information in each of which the timing difference is smaller than the first threshold (Steps S112 to S116).

Then, the channel control unit 55 specifies a cell that is associated with the highest wireless channel quality in the selected pieces of the timing time difference information (Steps S117 to S120). Consequently, an addition cell is selected.

A description will be given here by referring back to FIG. 15. The base station 50-1 requests the channel setting information from the base station 50-X that is associated with the addition cell (Step S105).

The base station 50-1 receives the channel setting information from the base station 50-X associated with the addition cell via a wired connection (Step S106). In this channel setting information, information needed to establish a wireless channel by using the addition cell, for example, system information about the bandwidth or the like; control information about the channel setting; information about a random access (for example, a dedicated random access preamble); and the like are included.

The base station 50-1 sends, to the terminal 10, the control signal in which the information about the addition cell and channel setting information that is received from the base station 50-X associated with the addition cell are included (Step S107). For the transmission of this control signal, for example, an RRCConnectionReconfiguration message that includes therein a Mobility Control Information IE is used.

If the base station 50 associated with the addition cell is the base station 50-1, the processes performed at Steps S105 to S107 are not performed between the base station 50-1 and the base station 50-X but are performed in the base station 50-1. Namely, the control unit associated with the first cell that is in communication in the base station 50-1 requests the channel setting information from the control unit that is associated with the addition cell (Step S105). The control unit associated with the first cell that is in communication receives the channel setting information from the control unit that is associated with the addition cell (Step S106). The control unit associated with the first cell that is in communication allows the transmitting unit that is associated with the first cell that is in communication to send, to the terminal 10, control signal in which the information about the addition cell and channel setting information received from the control unit associated with the addition cell are included (Step S107).

Figure 17:
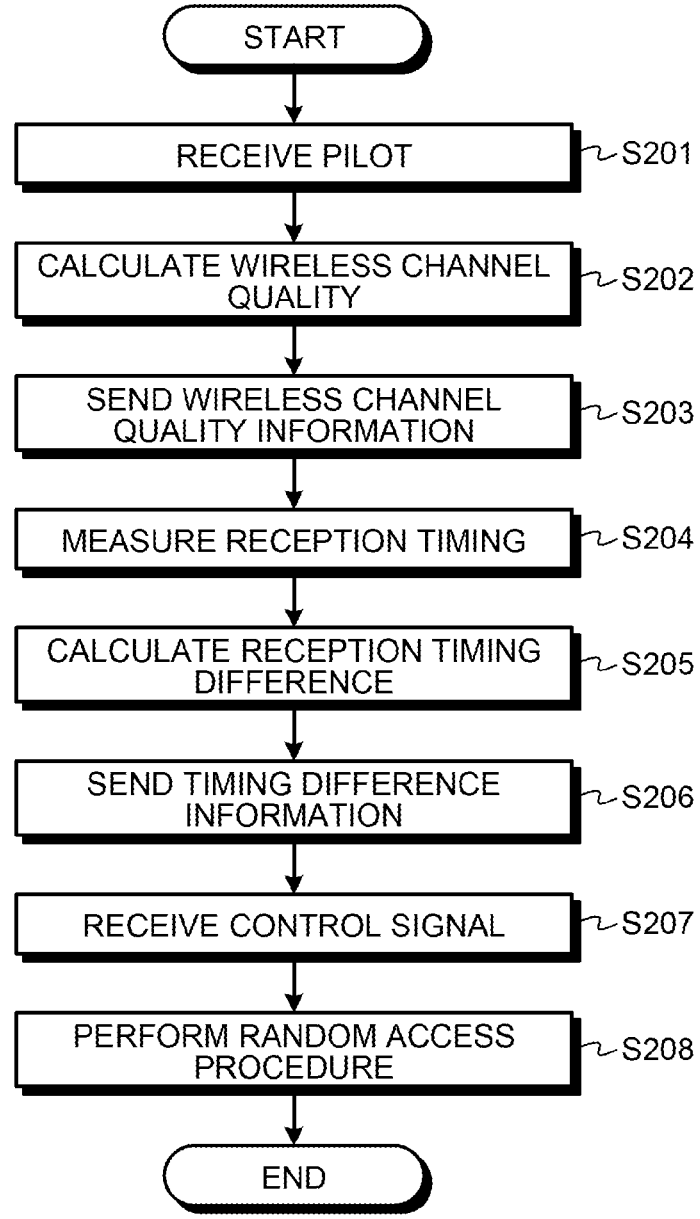
FIG. 17 is a flowchart illustrating an example of the operation of a process performed by a terminal according to the first embodiment.

FIG. 17 is a flowchart illustrating an example of the operation of a process performed by a terminal according to the first embodiment.

The terminal 10 receives the known signal (for example, a pilot) sent from the base station 50 that is present in an area in which the terminal 10 can receive the signal (Step S201) and the known signal extracting unit 13 extracts the known signal (for example, the pilot).

Then, the terminal 10 calculates, in the wireless channel quality measurement calculating unit 14, the wireless channel quality based on the known signal (for example, a pilot) extracted by the known signal extracting unit 13 (Step S202). The calculation of the wireless channel quality is performed for each of the first cell that is in communication and the measurement target frequency that is different from the frequency (i.e., a CC) associated with the first cell, i.e., the second cells.

Then, the terminal 10 sends the calculated wireless channel quality or a discrete value (for example, CQI) obtained by converting the wireless channel quality (for example, SIR) as the wireless channel quality information to the base station 50-1 that is associated with the first cell that is in communication (Step S203).

Furthermore, the terminal 10 measures the reception timing based on the known signal (for example, a pilot) extracted by the known signal extracting unit 13 (Step S204). The measurement of the reception timing is performed for each of the first cell that is in communication and the measurement target frequencies that are different from the frequency (i.e., a CC) that is associated with the first cell, i.e., the second cells.

Then, the terminal 10 calculates, in the timing difference calculating unit 16, a timing difference between the reception timing of the first cell and the reception timing of each of the second cells (Step S205).

The terminal 10 sends the information about the timing difference to the base station 50-1 associated with the first cell that is in communication (Step S206).

The terminal 10 receives, from the base station 50-1, the control signal sent by the first cell (Step S207). There may be a case in which, in this control signal, the information about the addition cell and the channel setting information that is needed to perform the reception from the base station 50-X associated with the subject addition cell are includes.

Figure 18:
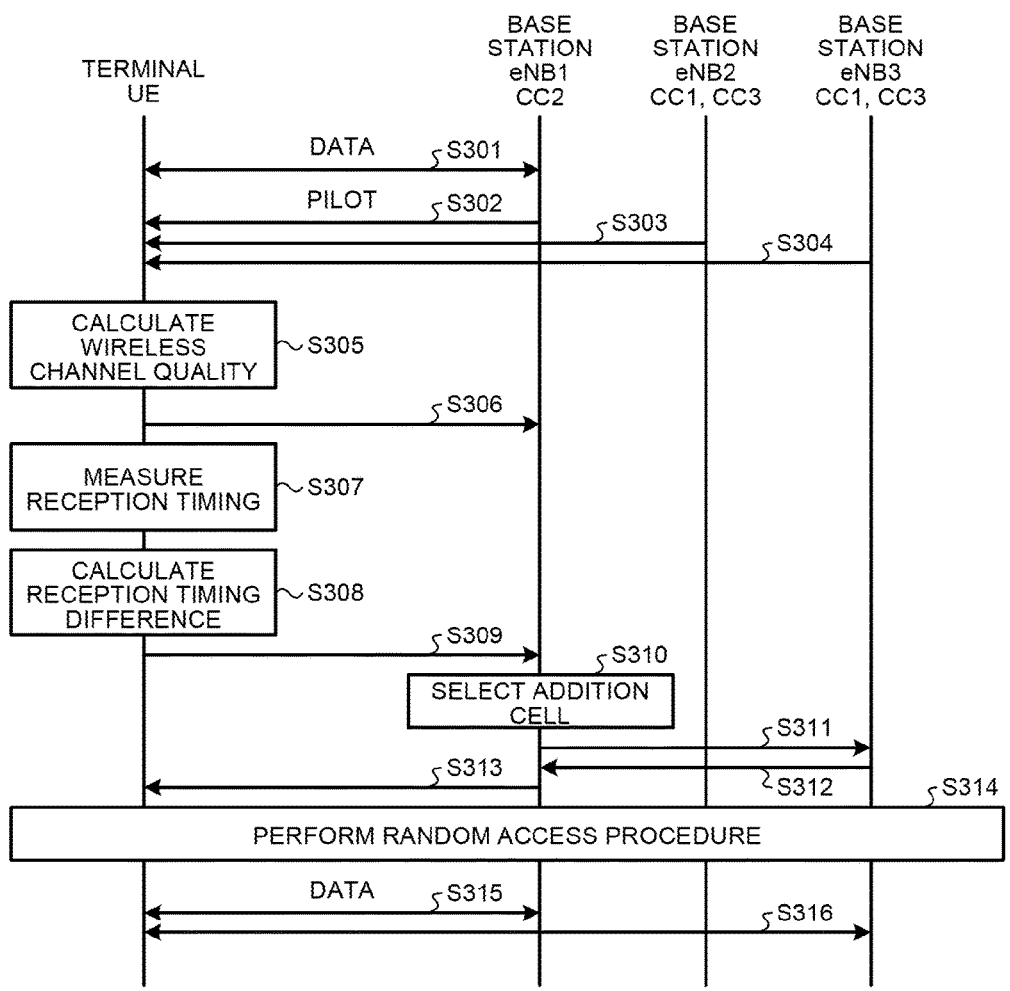
FIG. 18 is a sequence diagram illustrating an example of the operation of a process performed by the terminal and the base station according to the first embodiment.

In the following, a description will be given of the operation of a process performed by the terminal 10 and the plurality of the base stations 50 that are present in a coverage in which the terminal 10 can receive a signal. FIG. 18 is a sequence diagram illustrating an example of the operation of a process performed by the terminal and the base station according to the first embodiment. In FIG. 18, as an example, a description will be given by using a single terminal 10 (i.e., a UE), the eNB 1 that is the base station 50-1 to which the terminal 10 is being connected, and the eNBs 2 and 3 that are the base station 50-X to which the terminal 10 is not connected. Here, for the eNB 1, a wireless channel used in the first cell has already been established with the UE. The first cell is associated with the CC 2 in the eNB 1.

The UE and the eNB 1 communicate by using the CC 2 (Step S301).

Each of the eNBs 1 to 3 sends a known signal (for example, a pilot) by using each of the CCs (Steps S302 to S304). In this example, the CCs targeted for the measurement of the UE are used as the CC 1 and the CC 3 that are adjacent to the CC 2. Furthermore, the base stations 50-X associated with the addition cells are used as the eNBs 2 and 3 that are other than the eNB 1.

Then, the UE calculates, based on the known signal (for example, a pilot), the wireless channel quality of each of the cells (Step S305).

Then, the UE sends, to the eNB 1, the calculated the discrete value (for example, CQI), as the wireless channel quality information, that is obtained by converting the wireless channel quality (for example, SIR) (Step S306).

Furthermore, based on the known signal (for example, a pilot), the UE measures the reception timing of each of the cells (Step S307).

Furthermore, the UE calculates a reception timing difference between the reception timing in the CC 2 in the eNB 1 and the reception timing in each of the CC 1 and the CC 3 in the eNBs 2 and 3, respectively (Step S308).

Then, the UE sends the information about the timing difference to the eNB 1 (Step S309).

The eNB 1 selects an addition cell based on the wireless channel quality information and the timing difference information sent from the UE (Step S310). In this case, it is assumed that the CC 3 in the eNB 3 has been selected as the addition cell.

Thereafter, the eNB 1 sends, to the eNB 3 associated with the addition cell, a message that is used to request the channel setting information (Step S311).

The eNB 3 sends the channel setting information about the CC 3 in the eNB 3 to the eNB 1 (Step S312). At this point, as described above, the channel setting information includes therein the information, for example, system information, such as the bandwidth or the like, needed to establish a wireless channel by using an addition cell; control information about the channel setting; information (for example, a dedicated random access preamble) related to a random access; and the like. Furthermore, the eNB 3 selects a random access preamble associated with the addition cell from among a plurality of random access preamble candidates, includes the selected random access preamble in the channel setting information, and sends the information to the eNB 1.

The eNB 1 sends the information about the addition cell and the channel setting information about the addition cell to the UE (Step S313). For the transmission of this channel setting information, for example, a downlink control channel (PDCCH: Physical Downlink Control Channel) is used.

Figure 19:
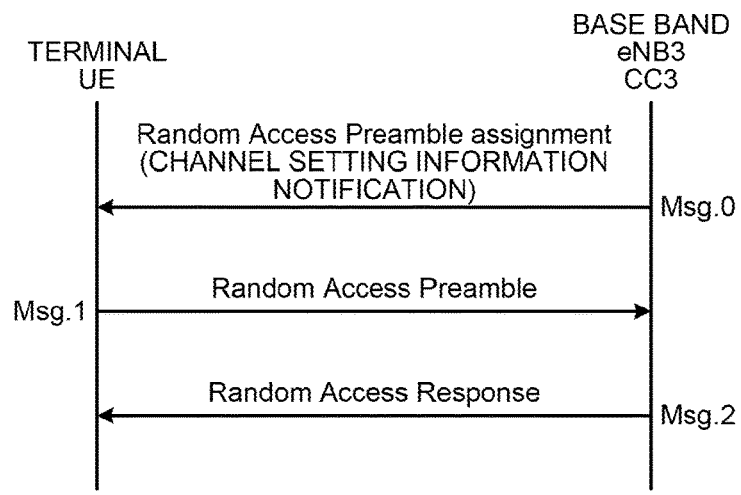
FIG. 19 is a schematic diagram illustrating an example of a random access procedure.

The UE performs the random access procedure on the CC 3 in the eNB 3 by using the channel setting information about the received addition cell (Step S314). FIG. 19 is a schematic diagram illustrating an example of a random access procedure. First, as the message 0, the channel setting information is sent from the eNB 3 to the UE via the eNB 1. This process is performed at Steps S312 and S313 described above. Then, the UE sends the dedicated random access preamble, which is to be sent by using the CC 3 in the eNB 3, as a message 1 by using the CC 3 in the eNB 3. Furthermore, the random access preamble is sent by the CC 3 that is the addition cell. Then, the eNB 3 sends, by using the CC 3, a random access response as a message 2 to the UE. Here, if the dedicated random access preamble that has already been notified to the UE via the eNB 1 matches the random access preamble received from the UE, the eNB 3 generates a random access response in the channel control signal generating unit 59 in the channel control unit 55. Consequently, a channel for the CC 3 is established between the UE and the eNB 3. In contrast, the eNB 3 measures, in the reception timing measuring unit 54, the reception timing of the random access preamble sent from the UE and then creates, in the channel control unit 55, a TA command based on the measured reception timing. This TA command is also included in the random access response and sent to the UE after.

Then, the UE sends and receives data by using the CC 2 in the eNB 1 and the CC 3 in the eNB 3 (Steps S315 and S316).

As described above, according to the first embodiment, in the base station 50-1, the acquiring unit 53 acquires information that indicates a difference between the first reception timing of the first cell that is in communication with the terminal 10 and the second reception timing of each of the plurality of the second cells associated with the base station 50-1 and the base station 50-X. Then, based on the reception timing difference between the first reception timing and the second reception timing, the channel control unit 55 generates a control signal that is used to notify the terminal 10 of an addition cell that is included in the plurality of the second cells and that is simultaneously used with the first cell.

Figure 20:
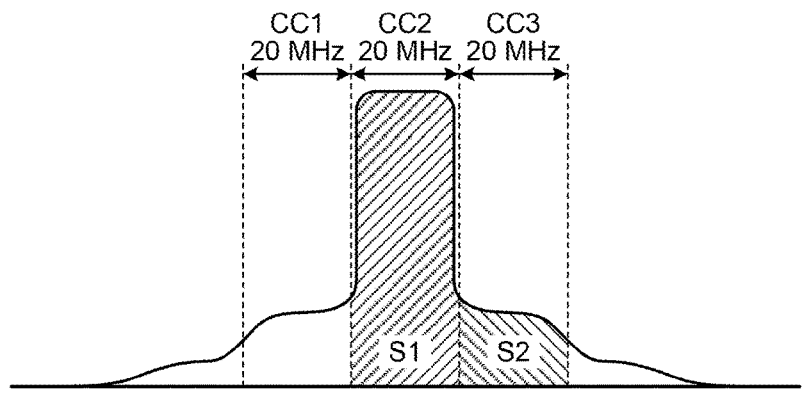
FIG. 20 is a schematic diagram illustrating spurious of a transmission wave.
Figure 21:
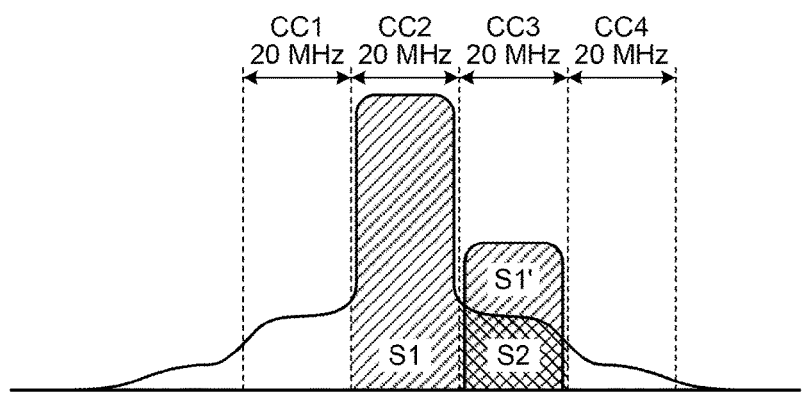
FIG. 21 is a schematic diagram illustrating degradation of the reception quality due to the spurious of the transmission wave.

With the configuration of the base station 50, it is possible to generate, based on the reception timing difference, a control signal, with respect to the terminal 10, that is used as the index of determining whether the uplink transmission timing and the downlink reception timing are overlapped between the cells or determining, if both the timings are overlapped, a sufficient overlap is present. Consequently, it is possible to prevent the degradation of the reception quality due to spurious of transmission waves. Namely, as illustrated in FIG. 20, even if the terminal 10 performs an uplink transmission in the CC 2, electrical power (S2 illustrated in FIG. 20) leaking to the CC other than the CC 2 is generated. In this state, if the terminal 10 performs a downlink reception in the CC 3 that is adjacent to the CC 2, as illustrated in FIG. 21, the spurious component prevents the downlink reception. This is because the ratio of the spurious component to the received power (S1' illustrated in FIG. 21) (i.e., the ratio of the signal electrical power to the interference power (SIR or SNR)) in the CC 3 is increased and degraded, and thus the reception quality is degraded. In particular, the electrical power of the spurious component in an adjacent CC (i.e., adjacent channel) tends to be increased. For example, this problem tends to occur when the ratio of the adjacent channel leakage electrical power (ACLR: Adjacent Channel Leakage Ratio) is large. This problem becomes more prominent when the propagation distance between the terminal 10 and base station 50 is small in the CC 1 and the propagation distance between the terminal 10 and the base station 50 is large in the CC 3. This difference of the propagation distance occurs due to a difference of the physical distance between the terminal 10 and the base station 50 or due to a difference between frequencies. However, according to the first embodiment, because a cell in each of which uplink transmission timing does not overlap with the downlink reception timing with respect to the first cell that is in communication can be used as an addition cell, it is possible to prevent degradation of the reception quality due to spurious of the transmission wave.

For example, the channel control unit 55 includes the cell selecting unit 75 that selects an addition cell from among the plurality of the second cells based on the reception timing difference and selects, as the addition cell from among the plurality of the second cells, a cell in which the reception timing difference is equal to or less than the first threshold.

Furthermore, the first threshold is set as a value in accordance with the length of a non-transmission section (i.e., gap section) prescribed by a subframe present between the downlink subframe and the uplink subframe. For example, if the TDD frame pattern is the configuration #0, DwPTS includes a total of 3 symbols, i.e., the RS, PSS, and another symbol 1. Here, the Reference Signal (RS) is a pilot and the Primary Synchronisation Signal (PSS) is a first synchronization signal, which is used by the terminal to detect the top of the frame of the signal sent from the base station or the timing of the top of the reception signal (reception symbol) and perform synchronization. The UpPTS corresponds to a single symbol of SRS. Here, the Sounding Reference Signal (SRS) is used by the base station to measure the wireless channel quality. Consequently, a gap corresponds to 10 symbols. Thus, if the TDD frame pattern is the configuration #0, the first threshold is set to the magnitude equal to or less than 10 symbols. If the TDD frame pattern is the configuration #0, the first threshold is preferably set to the magnitude equal to or less than, for example, 5 symbols. Furthermore, if the TDD frame pattern is the configuration #0, the first threshold may also set to the magnitude corresponding to, for example, 1 symbol or 2 symbols associated with UpPTS. Furthermore, if the TDD frame pattern is the configuration #1, the first threshold may be set to the magnitude equal to or less than, for example, 4 symbols.

In the communication system 1 described above, the following change can be performed.

[1] In the above description, the terminal 10 sends the timing difference calculated from the reception timing to the base station 50-1; however, the present invention is not limited thereto. For example, the terminal 10 may also send, to the base station 50-1, the information that indicates the first reception timing in the first cell that is in communication and the information that indicates the second reception timing in a plurality of the second cells having frequencies different from the frequency of the first cell. In this case, the base station 50-1 calculates a reception timing difference in the channel control unit 55 and selects an addition cell based on the calculated reception timing difference. Namely, in this case, the channel control unit 55 has a function of acquiring the reception timing difference. In short, the base station 50-1 may acquire information about the reception time of each cell in the terminal 10 and control, in accordance with the acquired information, a cell that is simultaneously used with the terminal 10.

[2] Furthermore, if the terminal 10 sends, to the base station 50-1, the information that indicates the second reception timing of each of the plurality of the second cells having frequencies different from the frequency of the first cell, the base station 50-1 may also perform the following process. Namely, the base station 50-1 estimates, in the TA setting unit 72 based on the reception timing, control information (i.e., a TA value) that is used to adjust the transmission timing of the terminal 10 in the second cells. Then, the base station 50-1 selects, in the cell selecting unit 75, an addition cell from among the plurality of the second cells on the basis the estimated control information and the control information that is used to adjust the transmission timing of the terminal 10 in the first cell.

[3] In the above description, a description is not particularly given of a case in which a cell in which the reception timing difference is equal to or less than the first threshold is not included in the plurality of the second cells; however, in such a case, the following process may also be performed.

(1) It is assumed that the CCs associated with the plurality of the second cells (i.e., an S-Cell candidate group) are adjacent to the first cell (CC) that is in communication. At this time, if a cell in which the reception timing difference is equal to or less than the first threshold is not included in the plurality of the second cells, the base station 50-1 quits CA and generates, in the channel control unit 55, a control signal that is sent to the terminal 10 as a notification. Namely, communication that uses only the first cell (i.e., a P-Cell) that is being connected is continued.

(2) The base station 50-1 selects a cell having the highest wireless channel quality from among the plurality of the second cells (i.e., the S-Cell candidate group) and sets one of the selected cell and the first cell (i.e., current P-Cell) that is in communication as a cell to be used, i.e., a P-Cell. At this time, the base station 50-1 generates, in the channel control unit 55, a control signal that indicates a change of cell to be used and then sends the control signal to the terminal 10. The S-Cell candidate group is changed every time the P-Cell is changed.

(3) It is assumed that the CCs associated with the plurality of the second cells are adjacent to the first cell (CC) that is in communication. At this time, the base station 50-1 selects, in the cell selecting unit 75, an addition cell from among a plurality of third cells associated with the frequencies away from the frequency associated with the first cell by a predetermined distance. For example, the acquiring unit 53 acquires the information that indicates the third reception timing of each of the plurality of the third cells or information that indicates the second reception timing difference between the first reception timing and the third reception timing. Then, the cell selecting unit 75 selects, as an addition cell from among the plurality of the third cells, a cell in which the second reception timing difference is equal to or less than the second threshold. The second threshold is greater than the first threshold. In this case, the terminal 10 has the configuration in which communication using a plurality of non-contiguous CCs can be performed.

(4) The base station 50-1 selects, as an addition cell from among the plurality of the second cells (i.e., the S-Cell candidate group), a cell having the highest wireless channel quality.

[4] In the above descriptions, descriptions have been given of a case in which an S-Cell is added with respect to the P-Cell by using the random access procedure. The processes of adding a cell described above may also be used when an S-Cell is changed when communication is performed between the P-Cell and one or more S-Cells. Namely, an S-Cell x that is in communication is deleted and an S-Cell y that is a candidate for an S-Cell is added. In other words, the S-Cell x is changed to the S-Cell y. This state possibly occurs at the time of, for example, handover.

[5] In the above descriptions, descriptions have been given with the assumption that an addition cell is added with respect to the first cell that is in communication; the embodiment is not limited thereto. Namely, in the base station 50-1, the acquiring unit 53 acquires information that indicates the reception timing of each of the cells associated with one of the base station 50-1 and the base station 50-X. In other words, in the base station 50-1, the acquiring unit 53 acquires the information that indicates the reception timing of each of the cells in which the terminals 10 are located. Alternatively, the acquiring unit 53 acquires a reception timing difference of each combination of the plurality of cells associated with the base station 50-1 and the base station 50-X. In other words, in the base station 50-1, the acquiring unit 53 acquires information indicating a reception timing difference between the cells in which the terminals 10 are located. Then, the channel control unit 55 may also generate, based on a reception timing difference of each combination, a control signal that is sent to the terminal 10 as a notification indicating a combination of cells in which the uplink transmission timing of one cell is not overlapped with the downlink reception timing of the other cell. The terminal 10 receives the control signal and performs communication by using a combination of the cells indicated by the control signal. The base station 50-1 may also exclude a combination of cells in the base station 50-X from the combinations of cells sent to the terminal 10 as a notification. In this case, the combination of the cells in the base station 50-X may also be excluded from the information that indicates the reception timing difference acquired by the acquiring unit 53.

[b] Second Embodiment

In the first embodiment, the base station selects, as the first step, an addition cell candidate based on the timing difference and selects, as the second step, an addition cell based on the wireless channel quality. In contrast, in a second embodiment, the terminal selects, as the first step, an addition cell candidate based on a timing difference and the base station selects, as the second step, an addition cell based on the wireless channel quality. A difference between the first embodiment and the second embodiment will be mainly given and descriptions of the parts that are the same as those according to the first embodiment are omitted. In a description below, a base station 150, which will be described later, associated with the first cell, i.e., the base station 150 that is being connected, may sometimes be referred to as a base station 150-1, whereas the base station 150 that is different from the base station 150-1 may sometimes be referred to as a base station 150-X. There may be a case in which the single base station 150-X is present or a case in which a plurality of the base stations 150-X is present. Furthermore, the base station 150-1 and the base station 150-X are simply referred to as the base station 150 as long as they need not be distinguished. The plurality of the base stations 150 may also be connected to a higher-level station by wired connection or may also be connected each other via the higher-level station. Alternatively, the plurality of the base stations 150 may also directly be connected by wired connection. Furthermore, the base stations 150 may also be, for example, base stations, femto base stations, or small-size base stations that use a radio remote header (RRH) in the LTE system.

Configuration Example of the Terminal

Figure 22:
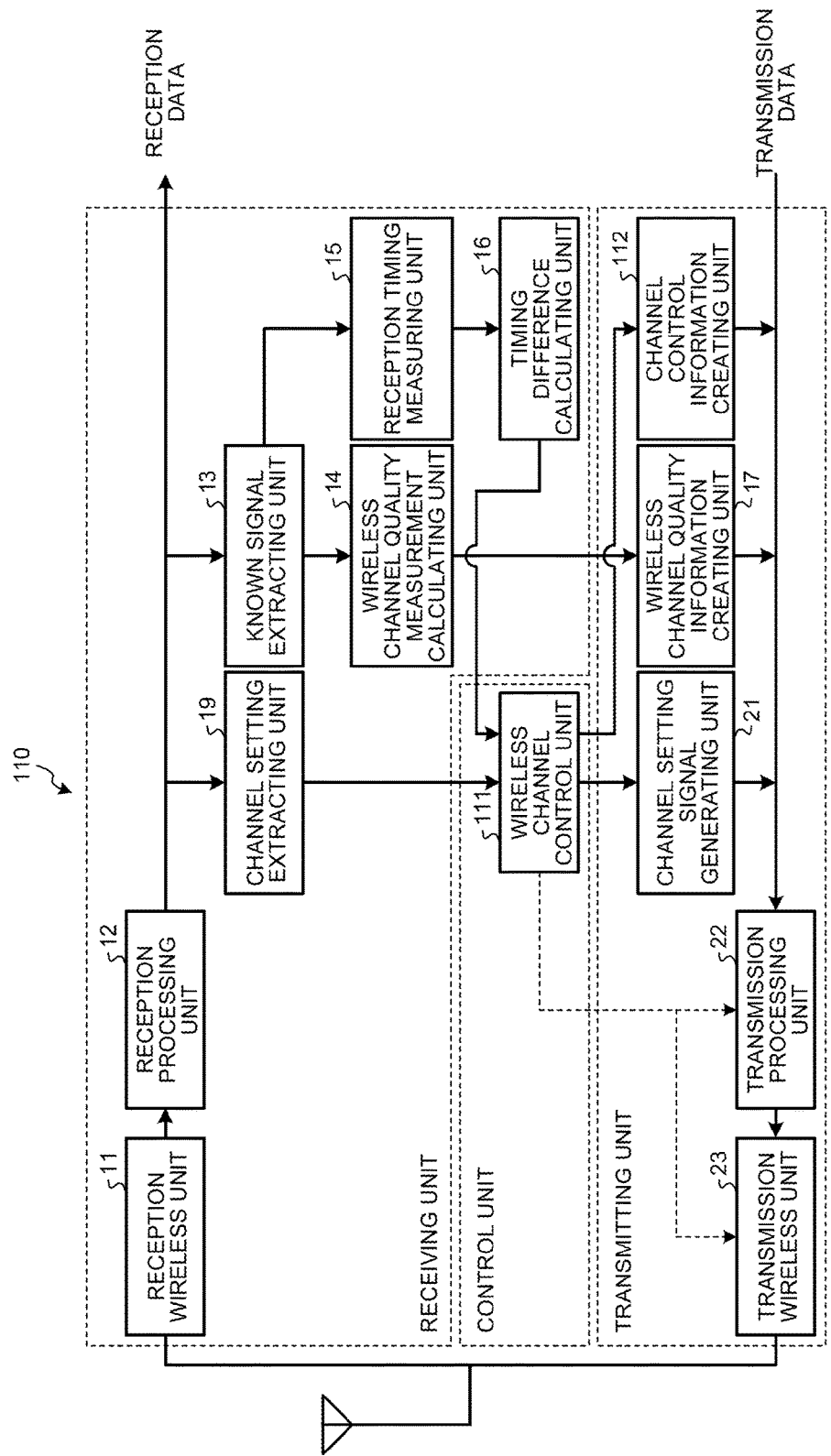
FIG. 22 is a functional block diagram illustrating an example of a terminal according to a second embodiment.

FIG. 22 is a functional block diagram illustrating an example of a terminal according to a second embodiment. In FIG. 22, a terminal 110 includes a wireless channel control unit 111 and a channel control information creating unit 112. Here, the reception wireless unit 11, the reception processing unit 12, the known signal extracting unit 13, the wireless channel quality measurement calculating unit 14, the reception timing measuring unit 15, the timing difference calculating unit 16, and the channel setting extracting unit 19 may also be used as a receiving unit. Furthermore, the wireless channel control unit 111 may also be used as a control unit. Furthermore, the wireless channel quality information creating unit 17, the channel setting signal generating unit 21, the transmission processing unit 22, the transmission wireless unit 23, and the channel control information creating unit 112 may also be used as a transmitting unit.

Furthermore, depending on an aspect of Carrier Aggregation, although not illustrated in FIG. 22, a plurality of a part or all of the transmitting unit and the receiving unit may also be provided. For example, if the frequency bands belonging to at least two different frequency bands are aggregated, a plurality of transmitting units and receiving units associated with the frequency bands to be used may also be provided.

The wireless channel control unit 111 has the same function as that performed by the wireless channel control unit 20 according to the first embodiment. Furthermore, the wireless channel control unit 111 generates, based on the timing difference calculated by the timing difference calculating unit 16, a control signal that is used to notify the base station 150-1 of a candidate for an addition cell that is used with the first cell that is in communication with the base station 150-1, which will be described later. There may be a case in which a plurality of addition cell candidates is present.

For example, if the wireless channel control unit 111 receives timing difference information about a plurality of the second cells from the timing difference calculating unit 16, the wireless channel control unit 111 selects, as addition cell candidates, cells in each of which the timing difference indicated by the timing difference information is equal to or less than the first threshold. Furthermore, the wireless channel control unit 111 sets the first threshold to a value according to the length of the gap section of the SF pattern that is commonly set in the first cell and the second cells. Furthermore, a cell associated with the base station 150-1 may also be excluded from the plurality of the second cells or a cell associated with the base station 150-1 may also be included in the plurality of the second cells. In a description below, as an example, a description will be given of a case in which the cell associated with the base station 150-1 is excluded from the plurality of the second cells.

Then, the wireless channel control unit 111 outputs the information about the selected addition cell candidates to the channel control information creating unit 112.

The channel control information creating unit 112 generates channel control information including the information about the addition cell candidates selected by the wireless channel control unit 111 and then outputs the channel control information to the transmission processing unit 22.

Configuration Example of the Base Station

Figure 23:
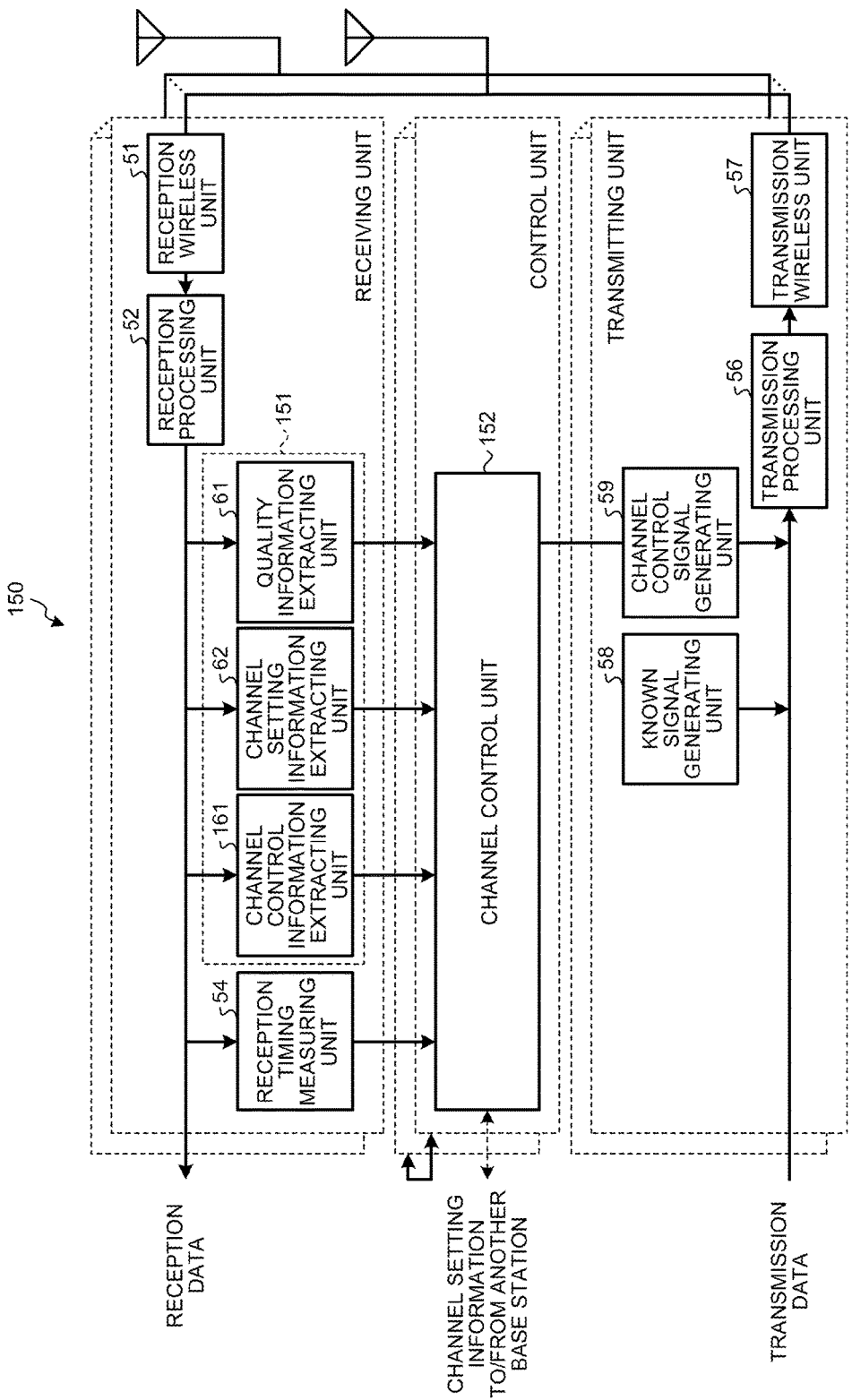
FIG. 23 is a functional block diagram illustrating an example of a base station according to the second embodiment.

FIG. 23 is a functional block diagram illustrating an example of a base station according to the second embodiment. In FIG. 23, the base station 150 includes an acquiring unit 151 and a channel control unit 152. Here, the reception wireless unit 51, the reception processing unit 52, the acquiring unit 151, and the reception timing measuring unit 54 may also be used as a receiving unit. Furthermore, the channel control unit 152 may also be used as a control unit. The transmission processing unit 56, the transmission wireless unit 57, the known signal generating unit 58, and the channel control signal generating unit 59 may also be used as a transmitting unit.

Furthermore, depending on an aspect of Carrier Aggregation, although not illustrated in FIG. 23, a plurality of a part or all of the transmitting unit and the receiving unit may also be provided. For example, if the frequency bands belonging to at least two different frequency bands are aggregated, a plurality of transmitting units and receiving units associated with the frequency bands to be used may also be provided.

Furthermore, the base station 150 may also include a plurality of sets of the receiving units, the control units, and the transmitting units described above and each of the sets may also be associated with each of the cells.

Furthermore, in the configuration example of the base station 150 described below, a description will be mainly given of a case in which the base station 150 is the base station 150-1 that is associated with the first cell.

The acquiring unit 151 extracts the channel control information from the reception data output from the reception processing unit 52. In the channel control information, as described above, information about the addition cell candidates selected by the terminal 10 may sometimes be included. For example, the acquiring unit 151 includes a channel control information extracting unit 161 and extracts channel control information by the channel control information extracting unit 161.

The channel control unit 152 selects, based on the wireless channel quality information, an addition cell from among one or a plurality of addition cell candidates included in the channel control information acquired by the acquiring unit 151. For example, the channel control unit 152 selects, as an addition cell from among the addition cell candidates, an addition cell having the highest quality that is indicated by the associated wireless channel quality information. The channel control unit 152 includes the information about the selected addition cell in the control signal and sends the control signal to the terminal 110.

Figure 24:
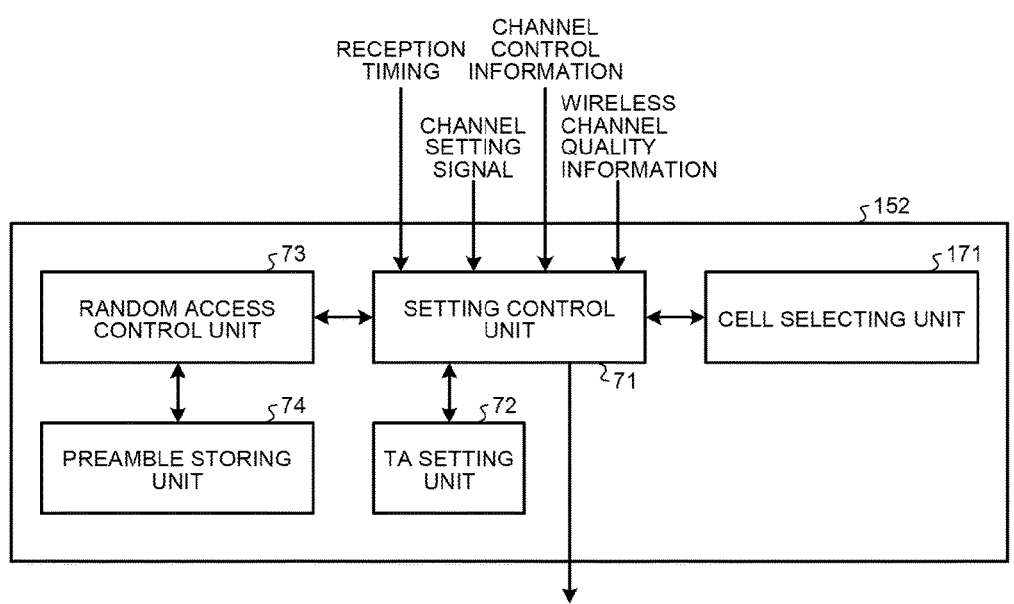
FIG. 24 is a functional block diagram illustrating an example of a channel control unit according to the second embodiment.

FIG. 24 is a functional block diagram illustrating an example of a channel control unit according to the second embodiment. In FIG. 24, the channel control unit 152 includes a cell selecting unit 171. The cell selecting unit 171 selects an addition cell from among one or the plurality of addition cell candidates based on the wireless channel quality information included in the channel control information acquired by the acquiring unit 151.

Operation of the Terminal and the Base Station

A description will be given of the operation of a process performed by the terminal 110 and the base station 150-1.

Figure 25:
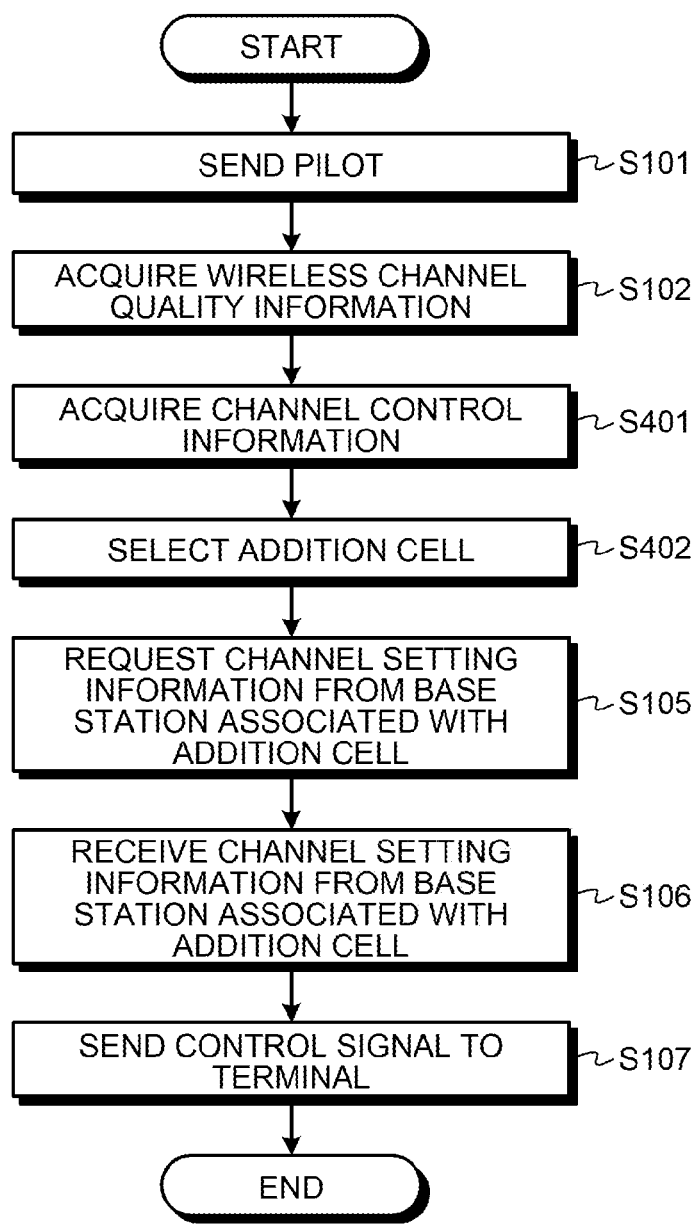
FIG. 25 is a flowchart illustrating an example of the operation of a process performed by the base station according to the second embodiment.

FIG. 25 is a flowchart illustrating an example of the operation of a process performed by the base station according to the second embodiment.

The base station 150-1 acquires, in the acquiring unit 151, the channel control information sent from the terminal 110 (Step S401). In this channel control information, as described above, the information about the addition cell candidates selected by the terminal 10 may sometimes be included.

Then, the base station 150-1 selects, based on the wireless channel quality information, an addition cell from among one or the plurality of the addition cell candidates included in the channel control information acquired by the acquiring unit 151 (Step S402).

Figure 26:
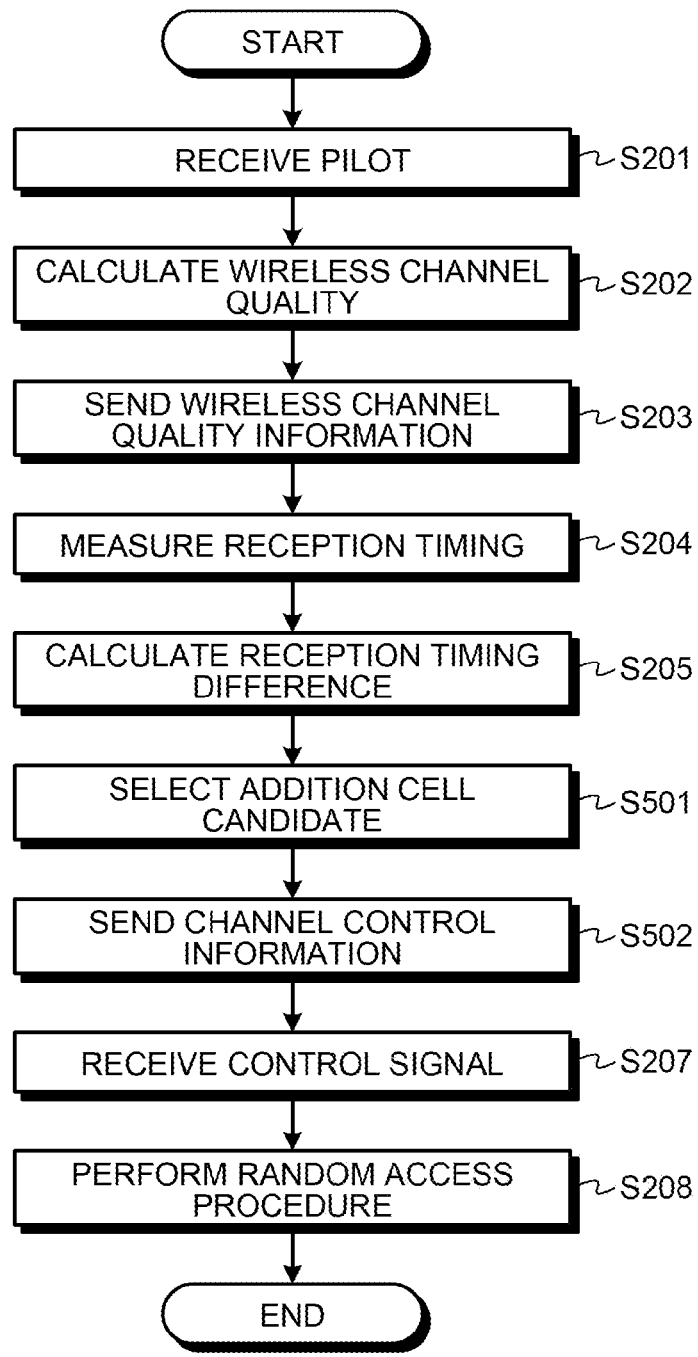
FIG. 26 is a flowchart illustrating an example of the operation of a process performed by the terminal according to the second embodiment.

FIG. 26 is a flowchart illustrating an example of the operation of a process performed by the terminal according to the second embodiment.

The terminal 110 selects, in the wireless channel control unit 111 based on the timing difference calculated by the timing difference calculating unit 16, an addition cell candidate that is simultaneously used with the first cell that is in communication with the base station 150-1 (Step S501).

Then, the terminal 110 sends, to the base station 50-1 that is associated with the first cell that is in communication, the channel control information in which the wireless channel quality information about the selected addition cell candidate is included (Step S502).

Figure 27:
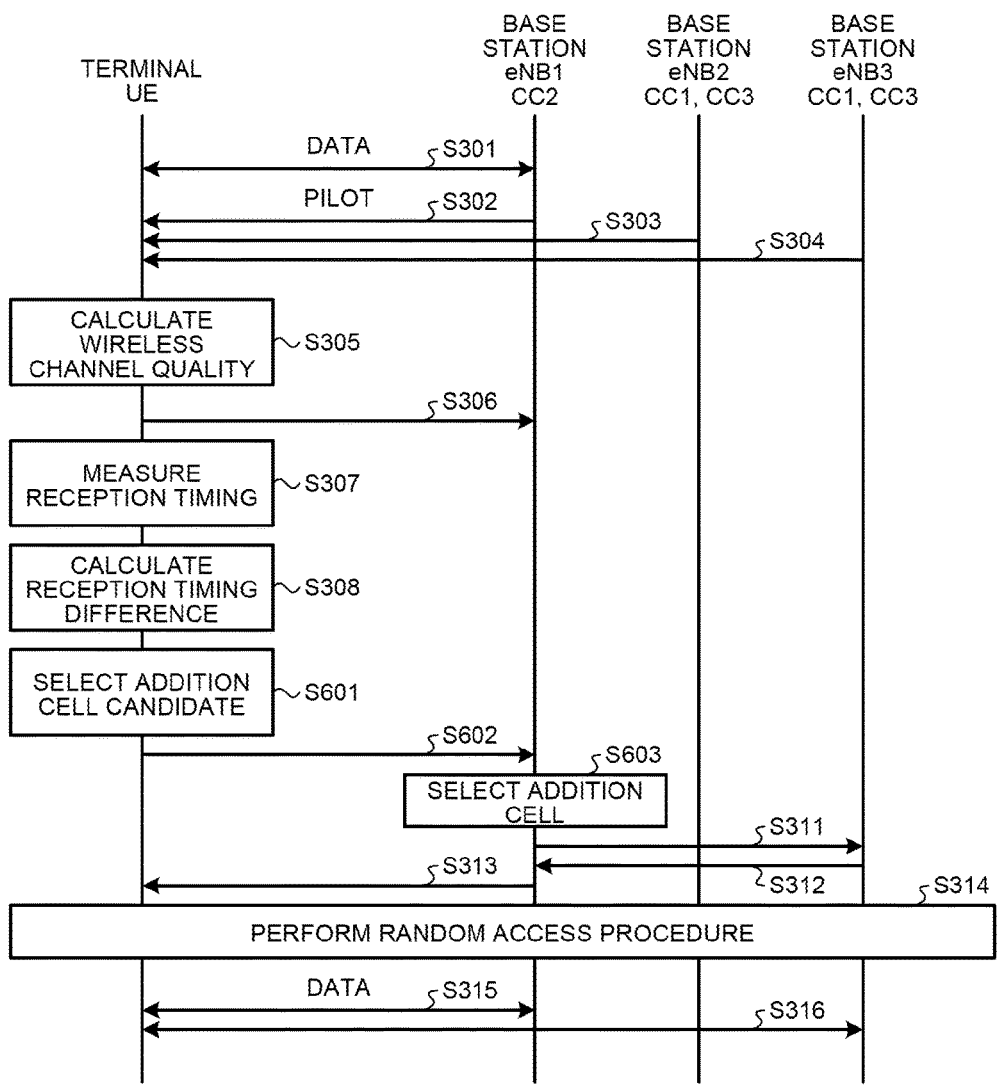
FIG. 27 is a sequence diagram illustrating an example of the operation of a process performed by the terminal and the base station according to the second embodiment.

Then, a description will be given of the operation of a process performed by the terminal 110 and the plurality of the base stations 150 that are present in a coverage in which the terminal 110 can receive a signal. FIG. 27 is a sequence diagram illustrating an example of the operation of a process performed by the terminal and the base station according to the second embodiment. In FIG. 27, as an example, a description will be given by using the single terminal 110 (i.e., a UE), the eNB 1 that is the base station 150-1 to which the terminal 110 is being connected, and eNBs 2 and 3 that are the base station 150-X to which the terminal 110 is not connected. Furthermore, for the eNB 1, a wireless channel used in the first cell has already been established with the UE. The first cell is associated with the CC 2 in the eNB 1.

The UE selects, based on the reception timing difference calculated at Step S308, an addition cell candidate that is simultaneously used with the first cell that is in communication with the eNB 1 (Step S601).

Then, the terminal 110 sends, to the eNB 1 associated with the first cell that is in communication, the channel control information in which information about the selected addition cell candidate and the wireless channel quality information about the selected addition cell are included (Step S602).

Then, the eNB 1 selects, based on the wireless channel quality information, an addition cell from among one or a plurality of the addition cell candidates included in the channel control information acquired by the acquiring unit 151 (Step S603).

As described above, according to the second embodiment, in the terminal 110, the wireless channel control unit 111 generates, based on the reception timing difference between the first reception timing and the second reception timing, a control signal that is sent to the base station 150-1 as a notification indicating the information about a candidate for the addition cell that is included in each of the plurality of the second cells and that is used together with the first cell.

With the configuration of the terminal 110, it is possible to generate, based on the reception timing difference, a control signal that is used as the index of determining whether the uplink transmission timing and the downlink reception timing are overlapped between the cells or determining, if both the timings are overlapped, a sufficient overlap is present. Furthermore, the terminal 110 performs communication by using the addition cell selected by the base station 150-1 that has received the subject control signal as a notification, thereby it is possible to prevent the degradation of the reception quality due to spurious of transmission waves.

[c] Third Embodiment

In a third embodiment, it is assumed that channels are sequentially and temporarily established for a plurality of candidates for an addition cell and, if a candidate for the subject addition cell satisfies a condition, the candidate for the subject addition cell is set as the addition cell. A difference between the first embodiment and the second embodiment will be mainly given and descriptions of the parts that are the same as those according to the first embodiment and the second embodiment are omitted. In a description below, a base station 250, which will be described later, associated with the first cell, i.e., the base station 250 that is being connected, may sometimes be referred to as a base station 250-1, whereas the base station 250 that is different from the base station 250-1 may sometimes be referred to as a base station 250-X. There may be a case in which the single base station 250-X is present or a case in which a plurality of the base stations 250-X is present. Furthermore, the base station 250-1 and the base station 250-X are simply referred to as the base station 250 as long as they need not be distinguished. The plurality of the base stations 250 may also be connected to a higher-level station by wired connection or may also be connected each other via the higher-level station. Alternatively, the plurality of the base station 250 may also directly be connected by wired connection.

Configuration Example of the Terminal

Figure 28:
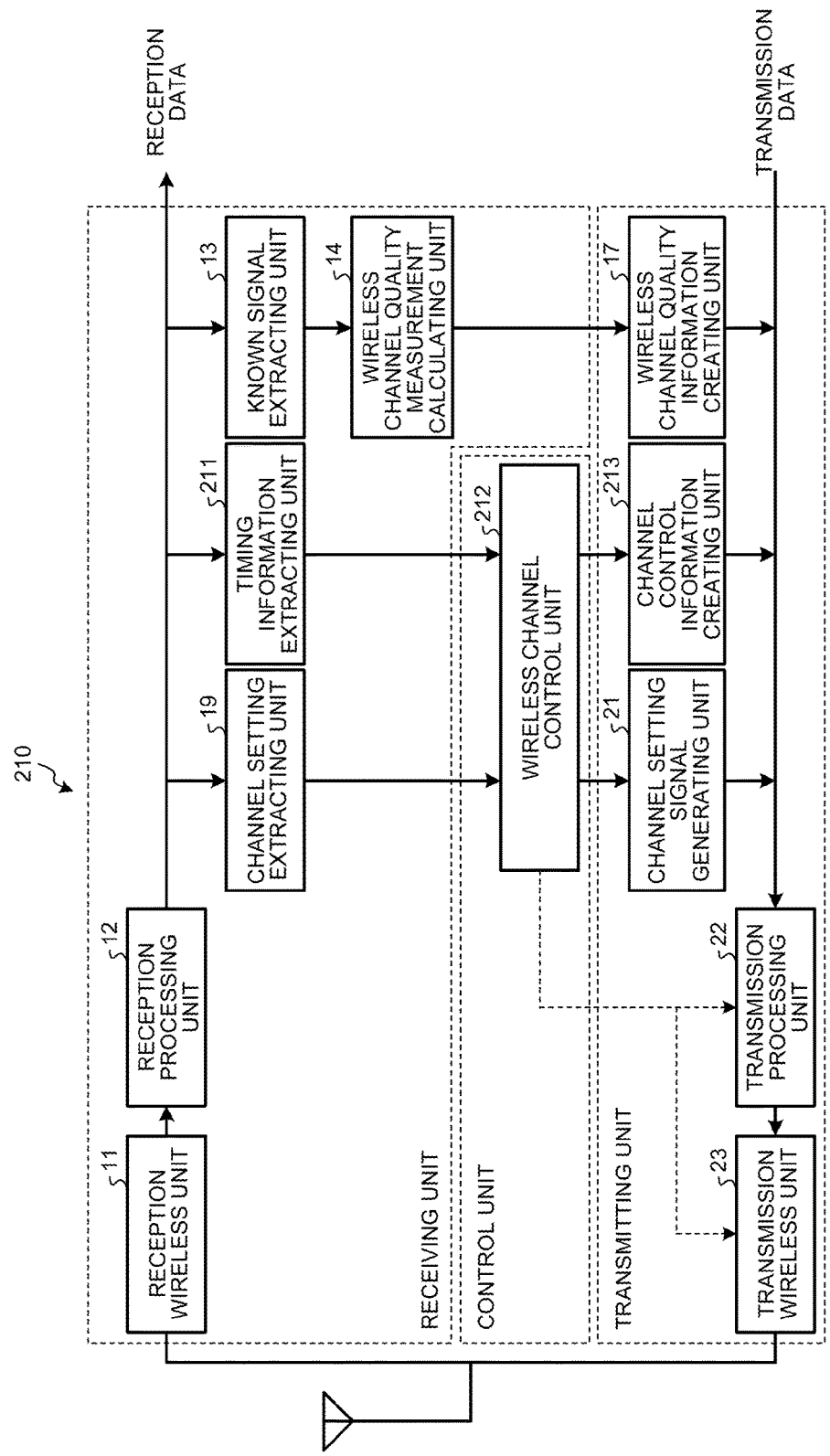
FIG. 28 is a functional block diagram illustrating an example of a terminal according to a third embodiment.

FIG. 28 is a functional block diagram illustrating an example of a terminal according to a third embodiment. In FIG. 28, a terminal 210 includes a timing information extracting unit 211, a wireless channel control unit 212, and a channel control information creating unit 213. Here, the reception wireless unit 11, the reception processing unit 12, the known signal extracting unit 13, the wireless channel quality measurement calculating unit 14, the channel setting extracting unit 19, and the timing information extracting unit 211 may also be used as a receiving unit. The wireless channel control unit 212 may also be used as a control unit. The wireless channel quality information creating unit 17, the channel setting signal generating unit 21, the transmission processing unit 22, the transmission wireless unit 23, and the channel control information creating unit 213 may also be used as a transmitting unit.

Furthermore, depending on an aspect of Carrier Aggregation, although not illustrated in FIG. 28, a plurality of a part or all of the transmitting unit and the receiving unit may also be provided. For example, if the frequency bands belonging to at least two different frequency bands are aggregated, a plurality of transmitting units and receiving units associated with the frequency bands to be used may also be provided.

The timing information extracting unit 211 extracts, from the reception data, in the random access procedure performed in an addition cell candidate that is the target for temporarily establishing a wireless channel, the transmission timing information sent from the base station 250 associated with the addition cell candidate and then outputs the subject transmission timing information to the wireless channel control unit 212. The transmission timing information corresponds to a TA command. Furthermore, because the transmission timing information about the currently connected first cell is periodically sent, the timing information extracting unit 211 also extracts this transmission timing information and outputs the transmission timing information to the wireless channel control unit 212. Furthermore, a cell associated with the base station 250-1 may also be excluded from the population (i.e., plurality of the second cells) of the addition cell candidates. Alternatively, a cell associated with the base station 250-1 may also be included in the population of the addition cell candidates. In the following, as an example, a description will be given of a case in which a cell associated with the base station 250-1 is excluded from the population of the addition cell candidates.

The wireless channel control unit 212 has the same function as that performed by the wireless channel control unit 20 according to the first embodiment. Furthermore, by using the channel setting information associated with the addition cell candidate received from the channel setting extracting unit 19, the wireless channel control unit 212 performs control such that, in the addition cell candidate, a random access preamble is sent and performs the random access procedure between the terminal 210 and the base station 250-X that is associated with the addition cell candidate.

Furthermore, the wireless channel control unit 212 outputs the transmission timing information extracted by the timing information extracting unit 211 to the channel control information creating unit 213 and allows the channel control information creating unit 213 to generate the channel control information that includes therein the transmission timing information.

The channel control information creating unit 213 generates the channel control information that includes therein the transmission timing information and outputs the information to the transmission processing unit 22. Consequently, the transmission timing information sent from the base station 250-X associated with the addition cell candidate can be sent, as a notification, to the base station 250-1 that is associated with the first cell.

Configuration Example of the Base Station

Figure 29:
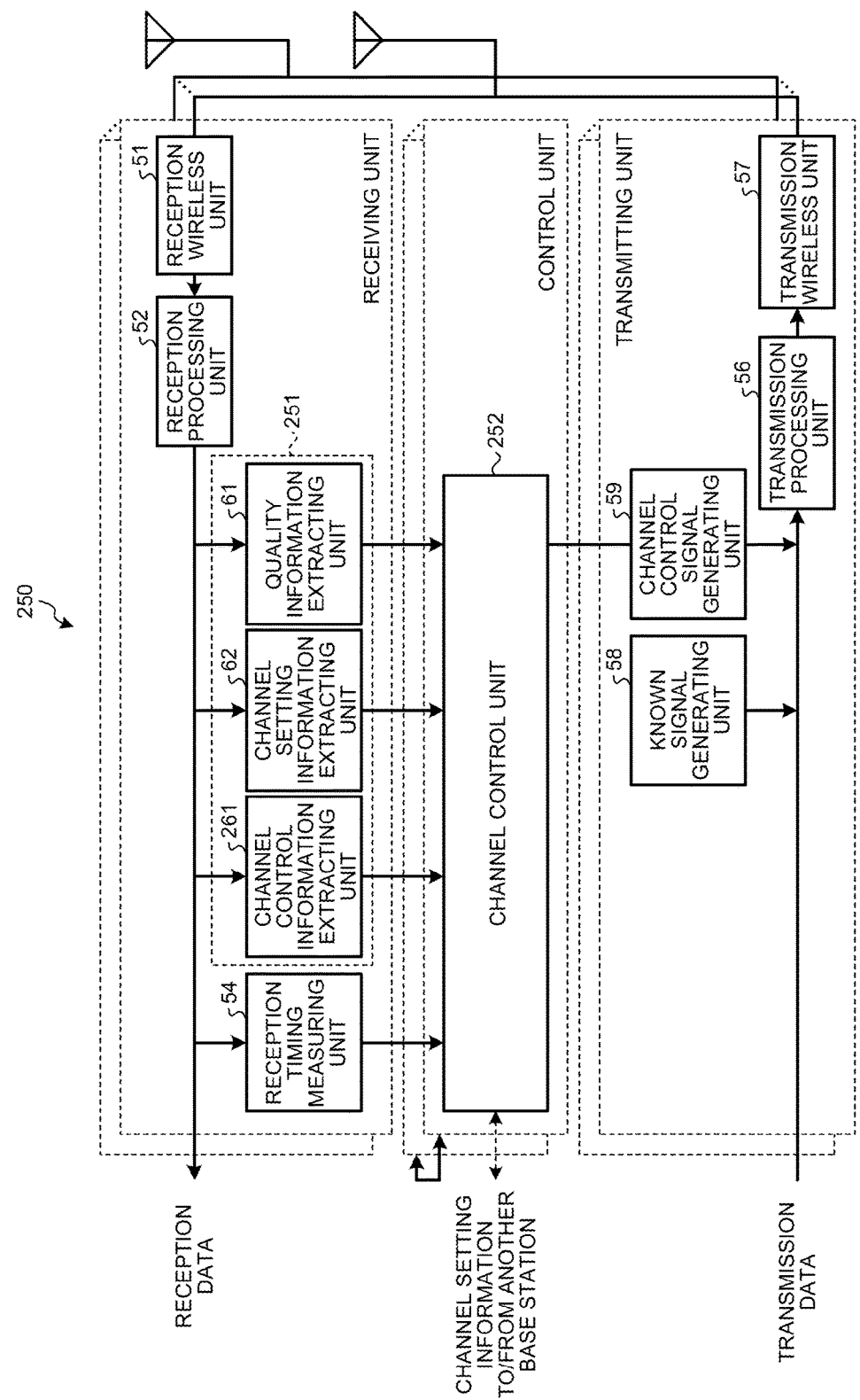
FIG. 29 is a functional block diagram illustrating an example of a base station according to the third embodiment.

FIG. 29 is a functional block diagram illustrating an example of a base station according to the third embodiment. In FIG. 29, the base station 250 includes an acquiring unit 251 and a channel control unit 252. Furthermore, the reception wireless unit 51, the reception processing unit 52, the acquiring unit 251, and the reception timing measuring unit 54 may also be used as a receiving unit. The channel control unit 252 may also be used as a control unit. The transmission processing unit 56, the transmission wireless unit 57, the known signal generating unit 58, and the channel control signal generating unit 59 may also be used as a transmitting unit.

Furthermore, depending on an aspect of Carrier Aggregation, although not illustrated in FIG. 29, a plurality of a part or all of the transmitting unit and the receiving unit may also be provided. For example, if the frequency bands belonging to at least two different frequency bands are aggregated, a plurality of transmitting units and receiving units associated with the frequency bands to be used may also be provided.

Furthermore, the base station 250 may also include a plurality of sets of the receiving units, the control units, and the transmitting units described above and each of the sets may also be associated with each of the cells.

Furthermore, in the configuration example of the base station 250 described below, a description will be mainly given of a case in which the base station 250 is the base station 250-1 that is associated with the first cell.

The acquiring unit 251 extracts the channel control information from the reception data output from the reception processing unit 52. In the channel control information, as described above, the transmission timing information sent from the base station 250-X associated with the addition cell candidate may sometimes be included. For example, the acquiring unit 251 includes a channel control information extracting unit 261 and extracts the channel control information by the channel control information extracting unit 261.

The channel control unit 252 selects, based on the wireless channel quality information about the plurality of the second cells acquired by the acquiring unit 251, an addition cell candidate from among the plurality of the second cells. For example, the channel control unit 252 selects, as an addition cell candidate from among the plurality of the second cells, the cell having the highest quality indicated by the wireless channel quality information.

Then, the channel control unit 252 requests the channel setting information about the addition cell candidate from the base station 250-X associated with the addition cell candidate and receives the channel setting information associated with the subject request from the base station 250-X associated with the addition cell candidate via the acquiring unit 251. This channel setting information is sent to the terminal 210. Consequently, the terminal 210 can perform the random access procedure in the addition cell by using this channel setting information.

Furthermore, based on the first transmission timing information about the terminal 210 in the first cell that is in communication with the terminal 210 and based on the second transmission timing information about the terminal 210 in the addition cell candidate, the channel control unit 252 determines whether the addition cell candidate is used as the addition cell. If a difference between the value indicated by the first transmission timing information and the value indicated by the second transmission timing information is equal to or less than the third threshold, the channel control unit 252 determines that the addition cell candidate is used as the addition cell. In contrast, if a difference between the value indicated by the first transmission timing information and the value indicated by the second transmission timing information is greater than the third threshold, the channel control unit 252 determines that the addition cell candidate is not used as the addition cell.

If the timing difference between the first transmission and the second transmission described above is equal to or less than the third threshold, the channel control unit 252 notifies the terminal 210 and the base station 250 that is associated with the addition cell of information, as the channel control information, indicating that the addition cell candidate is used as the addition cell.

In contrast, if the transmission timing difference is greater than the third threshold, the channel control unit 252 notifies the terminal 210 and the base station 250-X associated with the addition cell candidate this time of the information, as the channel control information, indicating that the addition cell candidate obtained this time is not used as an addition cell. Then, the channel control unit 252 selects, as the subsequent addition cell candidate from among the plurality of the second cells, the cell that has the second highest wireless channel quality and that is subsequent to the addition cell candidate obtained this time. The process described above is repeated by using the subject addition cell candidate as the addition cell candidate obtained this time. This repeatedly performed process may also be repeated until an addition cell candidate that satisfies a condition is found or may also be repeated until the number of times of processes reaches the predetermined maximum number of times. If no addition cell candidate that satisfies the condition is found even if the number of repetitions of the processes reaches the upper limit of the repetitions, the channel control unit 252 may also notify the terminal 210 of the information indicating that CA is not performed.

Figure 30:
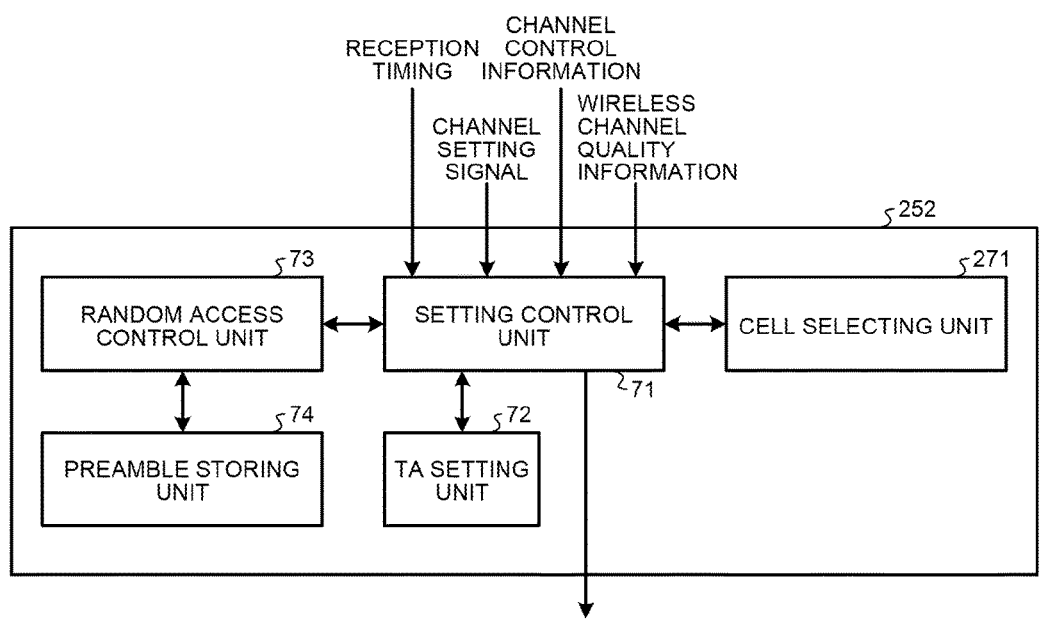
FIG. 30 is a functional block diagram illustrating an example of a channel control unit according to the third embodiment.

FIG. 30 is a functional block diagram illustrating an example of a channel control unit according to the third embodiment. In FIG. 30, the channel control unit 252 includes a cell selecting unit 271. The cell selecting unit 271 performs a process of selecting an addition cell candidate and a process of determining whether the addition cell candidate is used as an addition cell.

Operation Example of the Terminal and the Base Station

A description will be given of the operation of a process performed by the terminal 210 and the base station 250-1 having the configuration described above.

Figure 31:
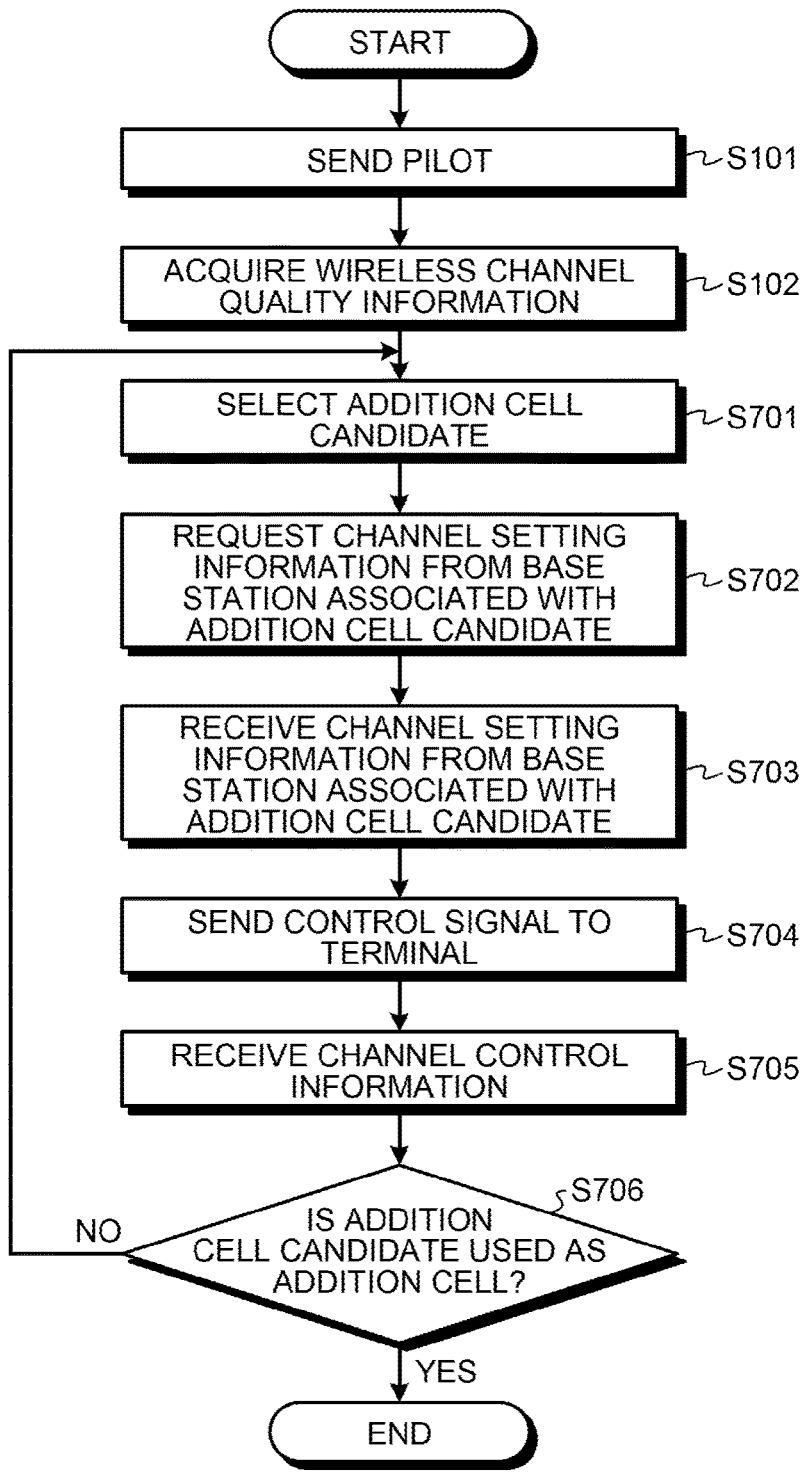
FIG. 31 is a flowchart illustrating an example of the operation of a process performed by the base station according to the third embodiment.

FIG. 31 is a flowchart illustrating an example of the operation of a process performed by the base station according to the third embodiment.

The base station 250-1 selects, in the channel control unit 252, an addition cell candidate from among the plurality of the second cells based on the wireless channel quality information about the plurality of the second cells acquired by the acquiring unit 53 (Step S701).

Then, the base station 250-1 requests, in the channel control unit 252, channel setting information about the addition cell candidate from the base station 250-X associated with the addition cell candidate (Step S702).

Then, the base station 250-1 receives the channel setting information from the base station 250-X associated with the addition cell candidate via a wired connection (Step S703).

Then, the base station 250-1 sends, to the terminal 210, the control signal that includes therein the information about the addition cell candidate and the channel setting information received from the base station 250-X associated with the addition cell candidate (Step S704).

Then, the base station 250-1 receives, in the channel control unit 252, channel control information that includes therein the second transmission timing information about the terminal 210 related to the addition cell candidate (Step S705).

Then, the base station 250-1 determines, in the channel control unit 252, whether the addition cell candidate is used as an addition cell (Step S706). In this determination, the first transmission timing information about the terminal 210 in the first cell that is in communication with the terminal 210 and the second transmission timing information about the terminal 210 in the addition cell candidate are used.

If the addition cell candidate is used as the addition cell (Yes at Step S706), the process ends. Thereafter, the terminal 210 performs communication by simultaneously using both the first cell and the addition cell.

In contrast, if the addition cell candidate is not used as the addition cell (No at Step S706), the base station 250-1 selects, in the channel control unit 252, the following addition cell candidate (Step S701). For example, the channel control unit 252 selects, as the subsequent addition cell candidate from among the plurality of the second cells, the cell that has the second highest wireless channel quality and that is subsequent to the addition cell candidate obtained this time.

Figure 32:
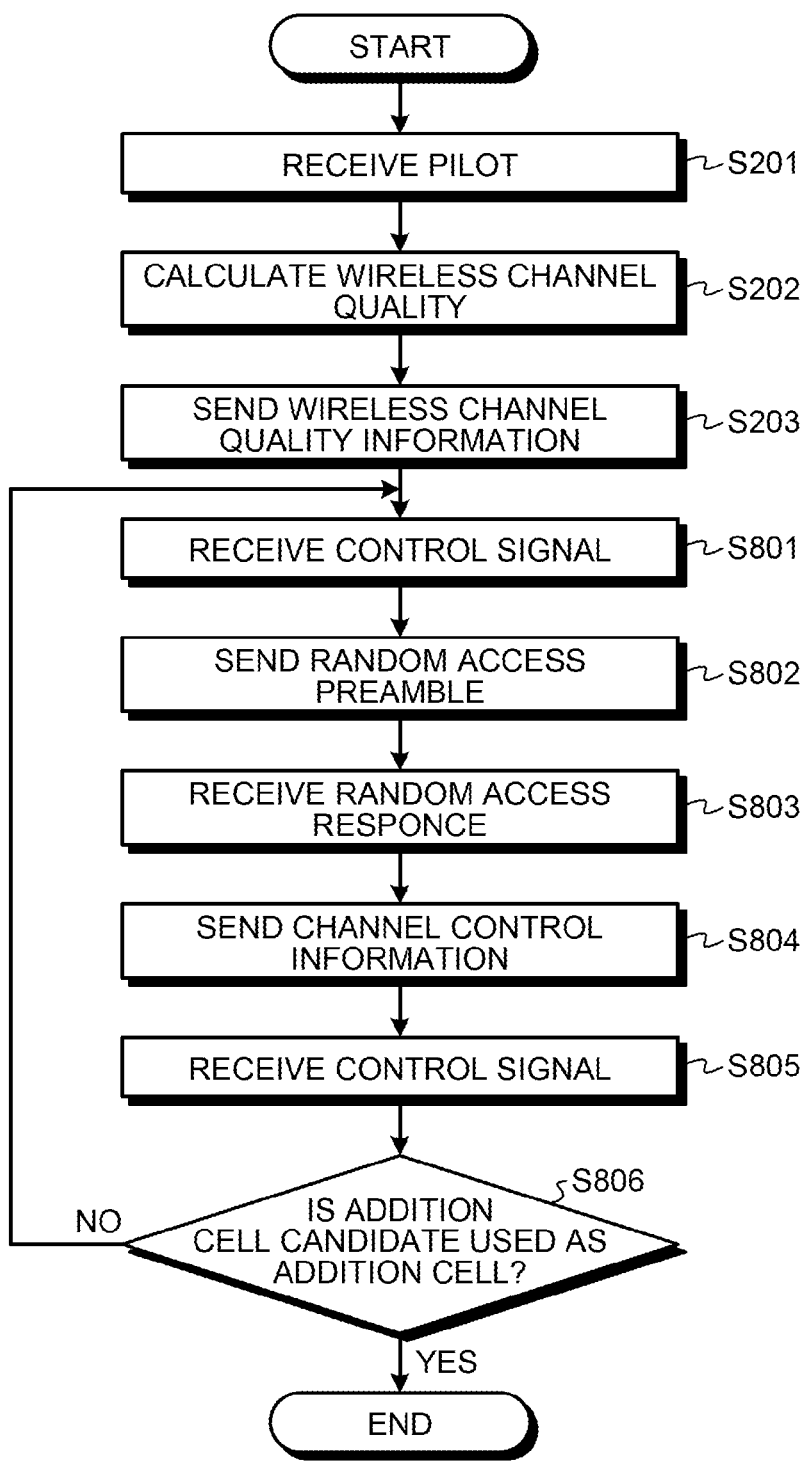
FIG. 32 is a flowchart illustrating an example of the operation of a process performed by the terminal according to the third embodiment.

FIG. 32 is a flowchart illustrating an example of the operation of a process performed by the terminal according to the third embodiment.

The terminal 210 receives, from the base station 250-1, the control signal sent from the first cell (Step S801). In this control signal, the information about the addition cell candidate and the channel setting information that is received from the base station 250-X associated with the addition cell candidate may sometimes be included.

Then, the terminal 210 sends, in the addition cell candidate, the random access preamble indicated by the channel setting information (Step S802).

Then, the terminal 210 receives, in the addition cell candidate, the random access response (Step S803).

Then, the terminal 210 sends, to the base station 250-1 associated with the first cell, the channel control information that stores therein transmission timing information about the addition cell candidate that is included in the random access response (Step S804).

Then, the terminal 210 receives the control signal sent from the base station 250-1 in the first cell (Step S805). In this control signal, information indicating whether the addition cell candidate obtained this time is used as an addition cell.

Then, the terminal 210 determines, based on the control signal, whether the addition cell candidate obtained this time is used as the addition cell (Step S806).

If the addition cell candidate this time is used as the addition cell (Yes at Step S806), the process ends. In contrast, if the addition cell candidate obtained this time is not used as the addition cell (No at Step S806), the process returns to Step S801.

Figure 33:
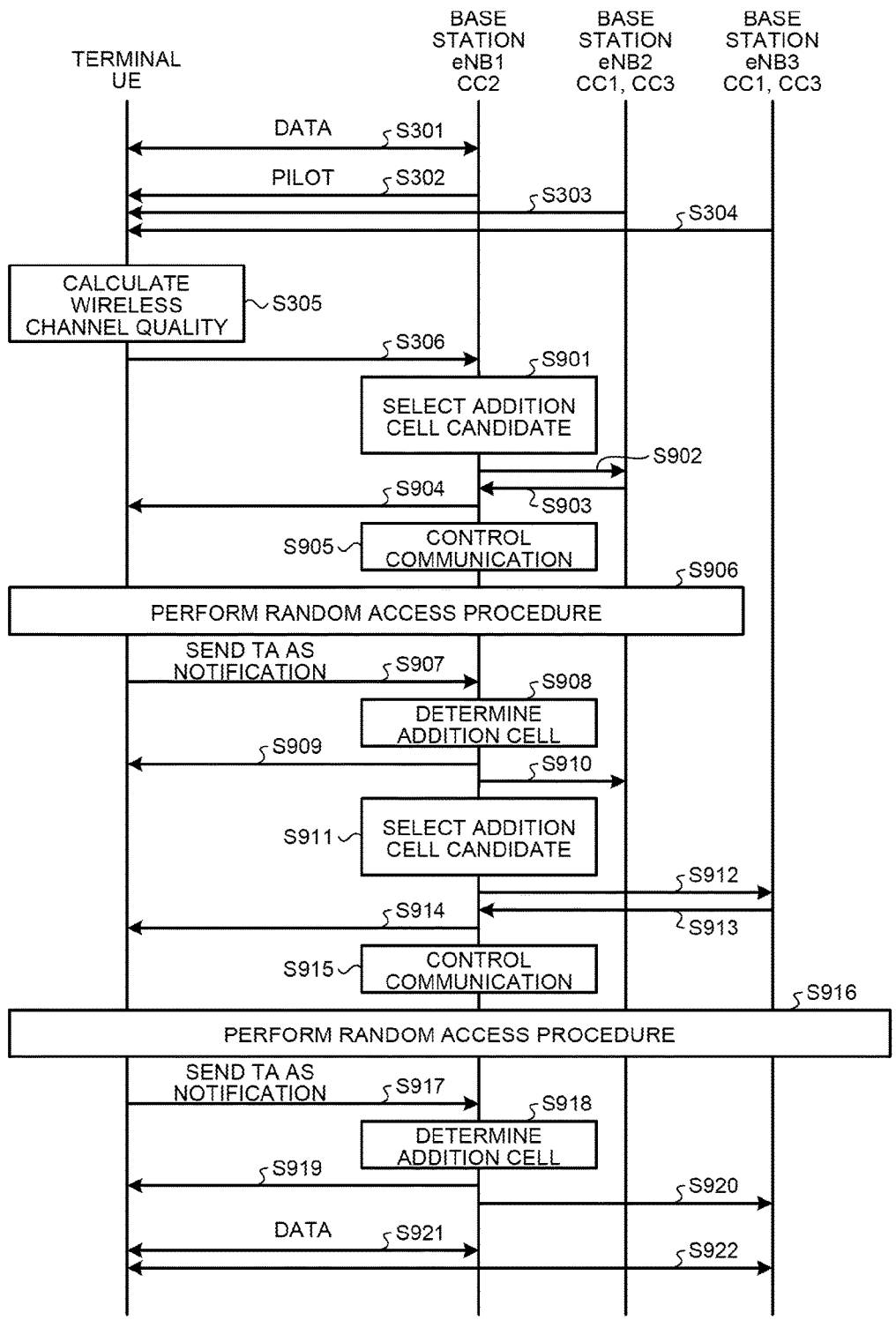
FIG. 33 is a sequence diagram illustrating an example of the operation of a process performed by the terminal and the base station according to the third embodiment.

In the following, a description will be given of the operation of a process performed by the terminal 210 and the plurality of the base stations 250 present in a coverage in which the terminal 210 can receive a signal. FIG. 33 is a sequence diagram illustrating an example of the operation of a process performed by the terminal and the base station according to the third embodiment. In FIG. 33, as an example, a description will be given by using the single terminal 210 (i.e., a UE), the eNB 1 that is the base station 250-1 to which the terminal 210 is being connected, and the eNBs 2 and 3 that are the base station 250-X to which the terminal 210 is not connected. Furthermore, for the eNB 1, a wireless channel used in the first cell has already been established with the UE. The first cell is associated with the CC 2 in the eNB 1.

The eNB 1 selects an addition cell candidate based on the wireless channel quality information sent from the UE (Step S901). In this case, it is assumed that the CC 3 in the eNB 2 is selected as the addition cell candidate.

Then, the eNB 1 sends, to the eNB 2 associated with the addition cell candidate, a message for requesting the channel setting information (Step S902).

Then, the eNB 2 sends the channel setting information about the CC 3 in the eNB 2 to the eNB 1 (Step S903). Here, as described above, in the channel setting information, information needed to temporarily establish an addition cell candidate, for example, system information about the bandwidth or the like; control information about the channel setting; information about a random access (for example, a dedicated random access preamble); and the like are included. Furthermore, the eNB 2 selects a random access preamble associated with an addition cell from among the plurality of the random access preamble candidates, includes the selected random access preamble in the channel setting information, and sends the information to the eNB 1.

Then, the eNB 1 sends the information about the addition cell candidate and the channel setting information about the addition cell candidate to the UE (Step S904). For example, a downlink control channel (PDCCH: Physical Downlink Control Channel) is used for the transmission of the channel setting information.

Furthermore, the eNB 1 controls communication performed by the first cell (Step S905). With this control, the communication between the UE and the eNB 1 in the first cell may also be stopped by the channel control unit 252 during, for example, the random access procedure that is performed later in order to temporarily establish a wireless channel that is used for an addition cell candidate. Consequently, because, it is possible to avoid, in the first cell, the transmission timing of one of the addition cell candidates and the reception timing of the other addition cell candidate from being overlapped, the random access procedure can be reliably performed. Alternatively, with this control, in the TDD method, for a subframe in which the uplink transmission timing of one of the addition cell candidates and the downlink reception timing of the other addition cell candidate are not theoretically overlapped, the period for which the random access procedure performed by an addition cell candidate may also be determined by the channel control unit 252 in the eNB 1. By doing so, because the random access procedure can be performed in the period for which the transmission timing of one of the addition cell candidates and the reception timing of the other addition cell candidate are not overlapped, the random access procedure can be reliably performed. In this case, the channel control unit 252 in the eNB 1 notifies the UE of the information that indicates the period of the random access procedure to be performed in the addition cell candidates. This period may also be notified in units of, for example, subframes or frames in each of which ten subframes are included. Alternatively, this period may also be notified by both a subframe that can be used as at least one reference and the number of contiguous subframes starting from the reference subframe. Here, in the TDD method, the subframe in which the uplink transmission timing of one of the addition cell candidates and the downlink reception timing of the other addition cell candidate are not theoretically overlapped is a subframe other than a downlink subframe, the immediately subsequent special subframe, and the immediately subsequent uplink subframe.

Then, the UE performs the random access procedure in the CC 3 in the eNB 2 by using the channel setting information about the received addition cell candidate (Step S906). Furthermore, at this point, the random access procedure does not have to be performed up to the last step because the transmission timing information about the addition cell candidate may be acquired. Furthermore, the eNB 2 creates a TA based on the reception timing of the random access preamble transmitted from the UE in the random access procedure, includes the created TA in the random access response, and sends the response to the UE.

Then, the UE notifies the eNB 1 associated with the first cell of the transmission timing information included in the random access response, i.e., the TA, received in the CC 3 (addition cell candidate) in the eNB 3 (Step S907).

Then, the eNB 1 determines, in the channel control unit 252, whether the addition cell candidate is used as an addition cell (Step S908). For this determination, the first transmission timing information (TA) about the UE in the first cell that is in communication with the UE and the second transmission timing information (TA) about the UE in the addition cell candidate are used. In this case, it is assumed that the addition cell candidate obtained this time is not used as the addition cell.

The eNB 1 sends, to the UE and the eNB 2 that is associated with the addition cell candidate, a notification indicating that the wireless channel of the addition cell candidate that was temporarily established by the channel control unit 252 is disconnected (Steps S909 and S910). Furthermore, at Step S906, if the random access procedure is not performed up to the last stage in the addition cell candidate, this notification does not have to also be sent.

The eNB 1 selects the next addition cell candidate (Step S911). Here, it is assumed that the CC 1 in the eNB 3 is selected as the addition cell candidate.

The eNB 1 sends, to the eNB 3 associated with the addition cell candidate, a message for requesting the channel setting information (Step S912).

The eNB 3 sends, to the eNB 1, the channel setting information about the CC 1 in the eNB 3 (Step S913). Here, as described above, the channel setting information includes therein the information needed to temporarily establish the addition cell candidate, for example, system information, such as the bandwidth or the like; control information about the channel setting; information (for example, a dedicated random access preamble) related to a random access; and the like. Furthermore, the eNB 3 selects a random access preamble associated with the addition cell from among a plurality of the random access preamble candidates, includes the selected random access preamble in the channel setting information, and sends the information to the eNB 1.

The eNB 1 sends the information about the addition cell candidate and the channel setting information about the addition cell candidate to the UE (Step S914). For example, a downlink control channel (PDCCH: Physical Downlink Control Channel) is used for the channel setting information.

Furthermore, the eNB 1 controls communication performed in the first cell (Step S915). This process is the same as that performed at Step S805.

The UE performs the random access procedure in the CC 1 in the eNB 3 by using the received channel setting information about the addition cell candidate (Step S916). At this point, the random access procedure does not have to be performed up to the last step because the transmission timing information on the addition cell candidate may be acquired.

The UE notifies the eNB 1 associated with the first cell of the transmission timing information included in the random access response, i.e., the TA, received in the CC 3 (addition cell candidate) in the eNB 3 (Step S917).

The eNB 1 determines, in the channel control unit 252, whether the addition cell candidate is used as an addition cell (Step S918). For this determination, the first transmission timing information (TA) about the UE in the first cell that is in communication with the UE and the second transmission timing information (TA) to the UE in the addition cell candidate are used. In this case, it is assumed that the addition cell candidate obtained this time is used as the addition cell.

The eNB 1 sends, to the UE and the eNB 3 that is associated with the addition cell candidate, a notification indicating that the wireless channel of the addition cell candidate that was temporarily established by the channel control unit 252 is maintained (Steps S919 and S920). Furthermore, at Step S916, if the random access procedure is not performed, in the addition cell candidate, up to the last stage, it may also possible to send a notification indicating that the random access procedure performed in the addition cell is again performed.

Then, the UE sends and receives data by using the CC 2 in the eNB 1 and the CC 1 in the eNB 3 (Steps S921 and S922).

As described above, according to the third embodiment, in the base station 250-1, the acquiring unit 251 acquires the first transmission timing information about the first cell and the second transmission timing information about each of the plurality of the second cells associated with the respective base station 250-1 and the base station 250-X. Then, the channel control unit 252 generates, based on the first transmission timing information and the second transmission timing information, a control signal that is included in the plurality of the second cells and that is used to notify the terminal 210 of an addition cell that is used with the first cell.

With the configuration of the base station 250-1, it is possible to generate, based on the transmission timing information, a control signal that is used as the index of determining whether the uplink transmission timing and the downlink reception timing are overlapped between the cells or determining, if both the timings are overlapped, a sufficient overlap is present. Consequently, it is possible to prevent the degradation of the reception quality due to spurious of transmission waves.

For example, the channel control unit 252 includes the cell selecting unit 271 that selects an addition cell from among the plurality of the second cells based on the difference between the first transmission timing and the second transmission timing and selects, as an addition cell from among the plurality of the second cells, a cell in which the transmission timing difference is equal to or less than the first threshold. Then, the third threshold is set to a value according to the length of a non-transmission section (i.e., gap section) prescribed by a subframe present between the downlink subframe and the uplink subframe.

Here, the following change may be performed in the communication system described above.

[1] In the sequence illustrated in FIG. 33, the transmission timing information on the addition cell candidates is sent to the eNB 1 via the UE; however, the embodiment is not limited thereto. For example, as illustrated in FIG. 34, the base station eNBs 2 and 3 associated with the addition cell candidates may also send the transmission timing information on the addition cell candidates to the eNB 1 that is associated with the first cell by using a wired connection.

Figure 34:
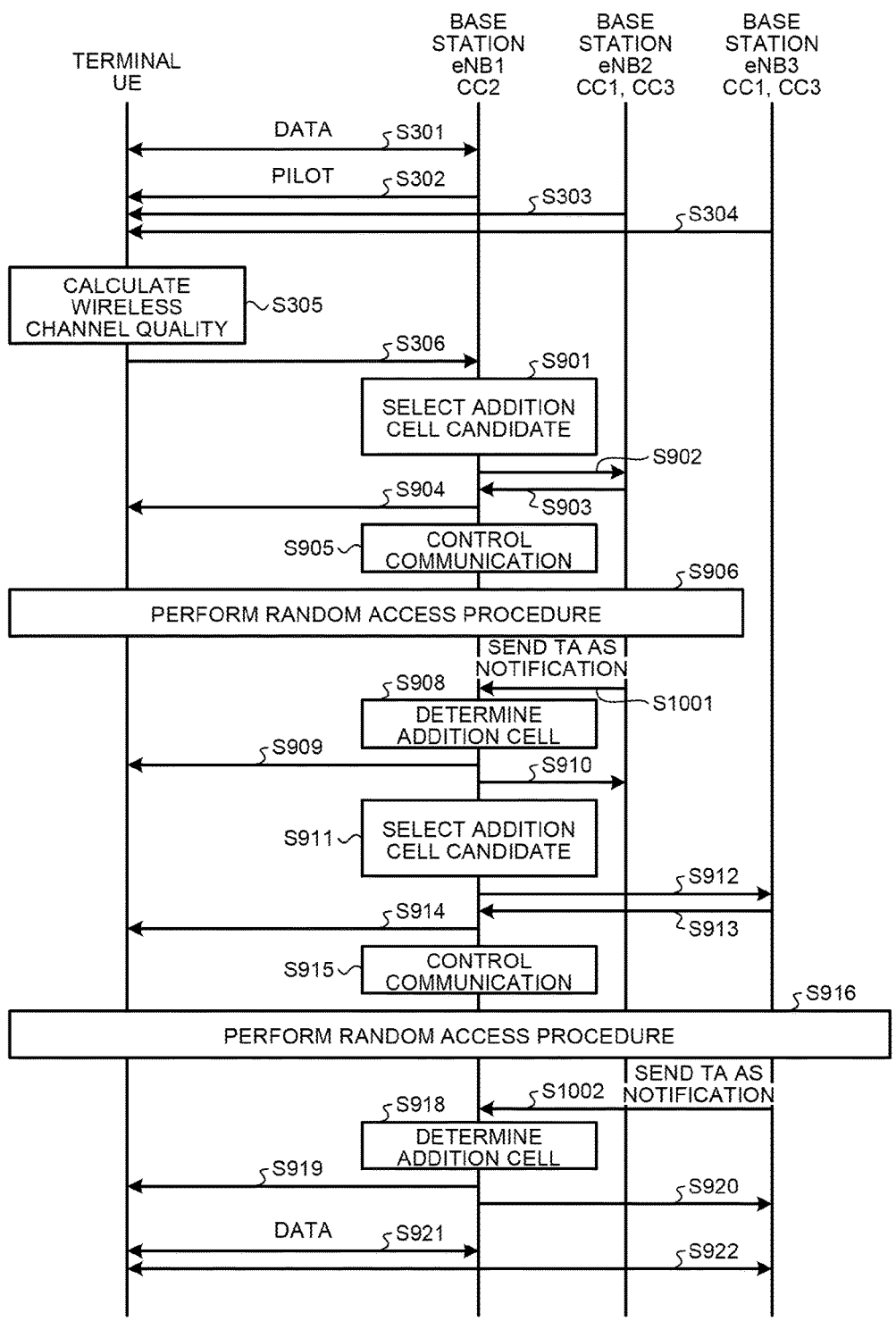
FIG. 34 is a sequence diagram illustrating another example of the operation of a process performed by the terminal and the base station according to the third embodiment.

FIG. 34 is a sequence diagram illustrating another example of the operation of a process performed by the terminal and the base station according to the third embodiment.

The eNB 2 includes, in the channel setting information, the transmission timing information, i.e., the TA, on the CC 3 in the eNB 2 and then sends the information to the eNB 1 that is associated with the first cell (Step S1001).

Furthermore, the eNB 3 includes, in the channel setting information, the transmission timing information, i.e., the TA, on the CC 1 in the eNB 3 and then sends the information to the eNB 1 that is associated with the first cell (Step S1002).

[2] In the above descriptions, descriptions have been given with the assumption that the base station 250-1 determines whether an addition cell candidate is used as an addition cell; however, the embodiment is not limited thereto. Namely, in the terminal 210, the wireless channel control unit 212 may also determine whether an addition cell candidate is used as an addition cell based on the transmission timing information on the first cell that is being connected and the transmission timing information on the addition cell candidate. In this case, the wireless channel control unit 212 notifies the base station 250-1 that the addition cell candidate is used as the addition cell.

[3] In the above descriptions, descriptions have been given with the assumption that the base station 250-1 determines whether an addition cell candidate is used as an addition cell based on the transmission timing information on the first cell that is being connected and based on the transmission timing information on the addition cell candidate; however, the embodiment is not limited thereto. For example, the base station 250-1 may also determine whether an addition cell candidate is used as an addition cell based on, for a known signal (for example, a pilot) sent from the terminal 210, the reception timing of the first cell in the base station 250-1 and the reception timing of the base station 250-X associated with the addition cell candidate. Namely, the base station 250-1 may also determine whether an addition cell candidate is used as an addition cell based on the reception timing of each of the known signals (for example, a pilot) that are sent in the uplink. In this case, similar to the case described above, the information about the reception timing of the base station 250-X associated with the addition cell candidate is transmitted to the base station 250-1 associated with the first cell via the terminal 210 or via a wired connection.

[d] Fourth Embodiment

In a fourth embodiment, common TDD frame patterns are used for all of the cells in the communication system. A description will be given with reference to FIG. 1.

The communication system 1 according to the fourth embodiment includes a plurality of the base stations 50 and a plurality of the terminals 10. In the plurality of the terminal 10, the terminals 10 that perform communication by using a plurality of cells may sometimes be included. Each of the base stations 50 performs communication by using the terminals 10 that are accommodated by the own device and by using at least one cell. Furthermore, a certain single TDD frame pattern is used for all of the cells in each of the base stations 50.

Here, in a case of the TDD, if different TDD frame patterns are used for the first cell and the second cells, a decrease in reception quality described above may possibly occur even in a subframe other than three contiguous subframes, i.e., a downlink subframe, a special subframe, and an uplink subframe. This problem becomes more prominent when the first CC in the first cell is adjacent to the second CC in the second cell used in communication by the single terminal 10. Accordingly, for the first cell and the second cells, i.e., the subject adjacent CCs, a common TDD frame pattern is preferably used. Furthermore, when focusing on the other terminals 10, a common TDD frame pattern is also preferably used in the other combinations of cells. Furthermore, even if a common TDD frame pattern is used for a group that collectively accommodates a plurality of cells, the terminal 10 may also possibly perform communication by using combinations of cells that belong to different groups. Consequently, it is preferable to use a common TDD frame pattern that is set in all of the cells associated with the plurality of the base stations 50 in the communication system 1.

For example, a TDD frame pattern that is used for the entirety of the communication system 1 is stored by each of the base stations 50. Then, each of the base stations 50 notifies the terminals 10 accommodated by the respective base stations 50 of the TDD frame pattern. For this notification, for example, in the LTE system, system information, such as a System Information Block (SIB), a Master Information Block (MIB), or the like, may also be used. Furthermore, this notification may also be periodically reported (broadcast). The terminals 10 that receive this system information perform communication in accordance with the notified TDD frame pattern.

Furthermore, an aspect of the fourth embodiment can be used for any of the first to the third embodiments.

Another Embodiment

[1] In the first to the fourth embodiments, an addition cell is selected on condition that a propagation delay difference is equal to or less than the threshold; however, the condition is not limited thereto. This condition is used as a first condition and a second condition may be set such that the sum of propagation delays is equal to or less than the threshold. Namely, an addition cell may also be selected on condition that both the first condition and the second condition are satisfied. The threshold associated with a propagation delay difference and a threshold associated with the sum of propagation delays may also be the same or may differ.

[2] In the first to the fourth embodiments, descriptions have been given with the assumption that TDD is mainly used; however, the embodiment is not limited thereto. For example, the technology described in the first to the fourth embodiments may also be used for FDD.

[3] The terminal and the base station described in the first to the fourth embodiments can be implemented by the following hardware configuration.

Figure 35:
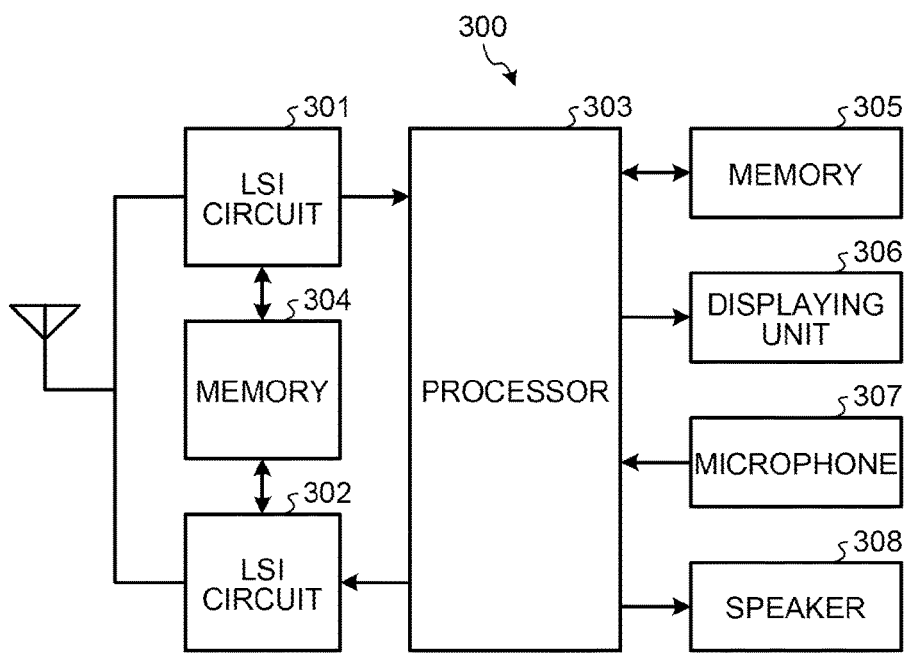
FIG. 35 is a block diagram illustrating an example of the hardware configuration of the terminal.

FIG. 35 is a block diagram illustrating an example of the hardware configuration of the terminal. In FIG. 35, a terminal 300 includes Large Scale Integrated (LSI) circuits 301 and 302, a processor 303, memories 304 and 305, a displaying unit 306, such as a liquid crystal display (LCD) or the like, a microphone 307, and a speaker 308. The processor 303 is connected to the LSI circuits 301 and 302, the memory 305, the displaying unit 306, the microphone 307, and the speaker 308 via a bus. Furthermore, each of the LSI circuits 301 and 302 is connected to the memory 304.

The LSI circuit 301 performs a process related to the reception in the terminal 300. Namely, the LSI circuit 301 a reception wireless process, a baseband receiving process, and the like. In contrast, the LSI circuit 302 performs a process related to the terminal 300. Namely, the LSI circuit 302 performs a baseband sending process, a transmission wireless process, or the like. Furthermore, examples of the processor 303 includes a central processing unit (CPU), a digital signal processor (DSP), a field programmable gate array (FPGA), or the like. Furthermore, example of the memories 304 and 305 includes a random access memory (RAM), such as a synchronous dynamic random access memory (SDRAM), or a read only memory (ROM), a flash memory, and the like. Furthermore, FIG. 35 illustrates the configuration example in which a baseband process is performed by the LSI circuits 301 and 302; however, the configuration in which the subject baseband process is performed by the processor 303 may also be used. Alternatively, a terminal may also include a plurality of processors. For example, the terminal may also be configured to have an application CPU that executes a process performed in the application layer, such as a process related to a user interface, and a wireless process CPU (sometimes be referred to as a baseband CPU) that performs a process mainly related to wireless control, such as various processing functions described in the first to the fourth embodiments as examples.

Then, the various processing functions performed in the terminals according to the first to the fourth embodiments may also be implemented by a processor included in a terminal executing programs stored in various memories, such as nonvolatile storage media or the like. Namely, the programs associated with the respective processes performed by a receiving unit (i.e., the reception processing unit 12, the known signal extracting unit 13, the wireless channel quality measurement calculating unit 14, the reception timing measuring unit 15, the timing difference calculating unit 16, the channel setting extracting unit 19, the timing information extracting unit 211, and the like) may also be stored in the memory 304 and each of the programs may also be executed by the LSI circuit 301. Furthermore, the programs associated with the respective processes performed by a control unit (i.e., the wireless channel control units 20, 111, and 212 or the like) may also be stored in the memory 305 and each of the programs may also be executed by the processor 303. Furthermore, the programs associated with the processes executed by the transmitting unit (i.e., the wireless channel quality information creating unit 17, the timing difference information creating unit 18, the channel setting signal generating unit 21, the transmission processing unit 22, the channel control information creating units 112 and 213, and the like) may also be recorded in the memory 304 each of the programs may also be executed by the LSI circuit 302. Furthermore, the programs associated with the respective processes executed by the receiving unit and the transmitting unit may also be executed by the processor 303 or may also be executed by a processor (for example, the baseband CPU described above) other than the processor 303.

Figure 36:
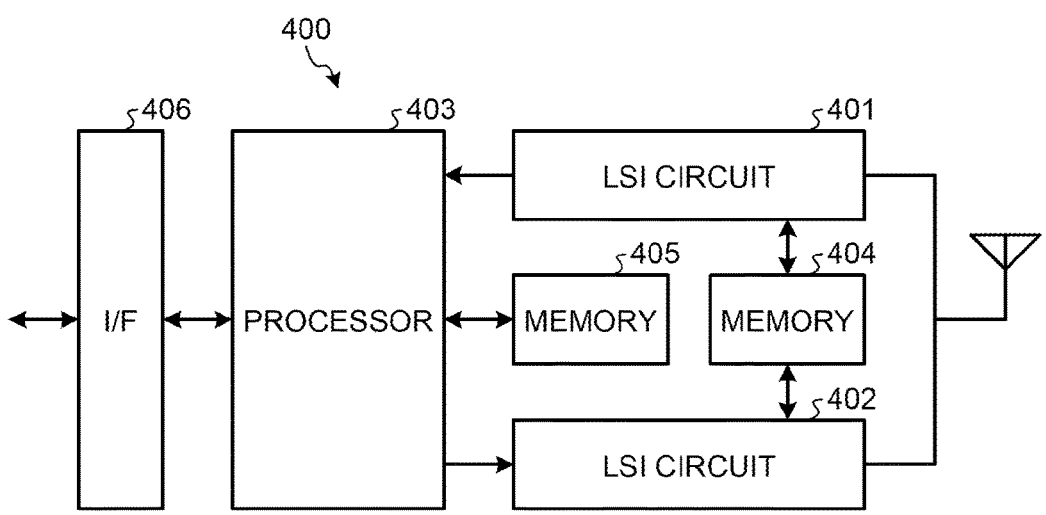
FIG. 36 is a block diagram illustrating an example of the hardware configuration of the base station.

FIG. 36 is a block diagram illustrating an example of the hardware configuration of the base station. In FIG. 36, a base station 400 includes LSI circuits 401 and 402, a processor 403, memories 404 and 405, and an interface (I/F) 406. The processor 403 is connected to the LSI circuits 401 and 402, the memory 405, and the I/F 406 via a bus. Furthermore, each of the LSI circuits 401 and 402 is connected to the memory 404.

The LSI circuit 401 performs a process related to the reception in the base station 400. Namely, the LSI circuit 401 performs a reception wireless process, a reception baseband process, and the like. In contrast, the LSI circuit 402 performs a process related to the transmission in the base station 400. Namely, the LSI circuit 402 performs a baseband sending process, a transmission wireless process, and the like. Furthermore, examples of the processor 403 include a CPU, a DSP, an FPGA, or the like. Furthermore, examples of the memories 404 and 405 include a RAM, such as an SDRAM, a ROM, a flash memory, or the like.

Then, various processing functions performed in the base stations according to the first to the fourth embodiments may also be implemented by a processor provided in the base stations executing programs stored in various memories, such as nonvolatile storage media. Namely, a program associated with each of the processes executed by the receiving unit (i.e., the reception processing unit 52, the acquiring units 53, 151, and 251, the reception timing measuring unit 54, or the like) may also be stored in the memory 404 and each of the programs may also be executed by the LSI circuit 401. Furthermore, a program associated with each of the processes executed by the control unit (i.e., the channel control units 55, 152, and 252, or the like) may also be stored in the memory 405 and each of the programs may also be executed by the processor 403. Furthermore, a program associated with each of the processes executed by the transmitting unit (i.e., the transmission processing unit 56, the known signal generating unit 58, the channel control signal generating unit 59, or the like) may also be stored in the memory 404 and each of the programs may also be executed by the LSI circuit 402.

Furthermore, here, a description has been given of a case in which a base station is a single device; however, the embodiment is not limited thereto. For example, the base station may also be formed by two separate devices, such as a wireless device and a control device. In this case, for example, both the LSI circuits 401 and 402 and the memory 404 are installed in the wireless device, whereas the processor 403, the memory 405, and the I/F 406 are installed in the control device.

According to an aspect of an embodiment of the present invention, degradation of the reception quality can be prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
a first base station;
one or more second base stations; and
a terminal,
the first base station includes
a receiver that receives information about reception time, at which the terminal receives information sent from the first base station by using a first frequency band and receives information sent from the first base station or the one or more second base stations by using one or more second frequency bands or transmission time, at which the first base station sends information by using the first frequency band, and the first base station or the one or more second base stations send information by using one or more second frequency bands,
a selector that selects from among the one or more second frequency bands, based on information about the reception time or the transmission time received by the receiver, the second frequency bands that are simultaneously used with the first frequency band by the terminal, and
a first controller that performs control about the selected second frequency bands, and
the terminal includes
a second controller that performs control, in accordance with the control performed by the first base station, such that communication is performed by simultaneously using the first frequency band and selected second frequency bands,
the terminal complies with a control signal that is generated based on a propagation delay difference between first propagation delay and second propagation delay in the first base station to perform communication by using a plurality of cells in which uplink transmission timing and downlink reception timing do not overlap with each other.

2. The communication system according to claim 1, wherein
the receiver receives information about one or more first reception time differences, as information about the reception time, based on first reception time of information sent from the first base station by using a first frequency band and second reception time of information sent from the first base station and the one or more second base stations by using one or more second frequency bands,
a generator generates, based on the information about the one or more first reception time differences, control information about a second frequency band that is simultaneously used with the first frequency band by the terminal, and
the first base station further includes a transmitter that transmits the control information to the terminal.

3. The communication system according to claim 2, wherein the first controller includes the selector that selects, from among the one or more second frequency bands based on the information about the one or more first reception time differences, the second frequency band that is simultaneously used with the first frequency band by the terminal and creates control information about the selected second frequency band.

4. The communication system according to claim 3, wherein the selector selects, from among the one or more second frequency bands, by using the first reception time differences and a first threshold that is previously determined in the first base station or determined between the first base station and the terminal, the second frequency band simultaneously used with the first frequency band by the terminal.

5. The communication system according to claim 4, wherein the selector controls the first threshold in accordance with a protection period between a downlink transmission period and an uplink reception period.

6. The communication system according to claim 4, wherein, when it is not possible to select, from among the one or more second frequency bands, the second frequency band that is simultaneously used with the first frequency band by the terminal, the selector selects, from among one or more third frequency bands that are different from the first frequency band by a frequency equal to or greater than a predetermined frequency, a third frequency band that is simultaneously used with the first frequency band by the terminal.

7. The communication system according to claim 6, wherein
the receiver receives information that indicates one or more second reception time differences between the first frequency band and each of the third frequency bands, and
the selector selects, from among the one or more third frequency bands, by using the second reception time differences and a second threshold that is previously determined in the first base station or determined between the first base station and the terminal, the third frequency band simultaneously used with the first frequency band by the terminal.

8. A base station that performs communication with a terminal that performs communication with one or more base stations by simultaneously using a plurality of frequency bands, the base station comprising:
a receiver that receives at least one of information about reception time, at which the terminal receives information sent from the base station by using a first frequency band and receives information sent from the first base station or one or more base stations other than the base station by using one or more second frequency bands, or transmission time, at which the first base station sends information by using the first frequency band, and the first base station or the one or more second base stations send information by using one or more second frequency bands; and
a selector that selects from among the one or more second frequency bands, based on information about the reception time or the transmission time received by the receiver, the second frequency bands that are simultaneously used with the first frequency band by the terminal,
the terminal complies with a control signal that is generated based on a propagation delay difference between first propagation delay and second propagation delay in the first base station to perform communication by using a plurality of cells in which uplink transmission timing and downlink reception timing do not overlap with each other.

9. A terminal that performs communication with one or more base stations by simultaneously using a plurality of frequency bands, the terminal comprising:
a measuring device that measures reception time of information sent from a first base station by using a first frequency band and that measures reception time of information sent from each of the first base station or a second base station by using a second frequency band;
a transmitter that notifies the first base station of at least one of reception time information and information about a candidate for the second frequency band that is simultaneously used with the first frequency band, based on reception time measurement results in the measuring device;
a receiver that receives control information about a second frequency band that is selected based on the reception time information or the information about the candidate for the second frequency band and that is simultaneously used with the first frequency band; and
a controller that performs control, based on the control information, such that communication is performed by simultaneously using the first frequency band and the second frequency band,
the terminal complies with a control signal that is generated based on a propagation delay difference between first propagation delay and second propagation delay in the first base station to perform communication by using a plurality of cells in which uplink transmission timing and downlink reception timing do not overlap with each other.

10. A terminal that performs communication with one or more base stations by simultaneously using a plurality of frequency bands, the terminal comprising:
a receiver that receives first transmission time information sent from a first base station by using a first frequency band and that receives second transmission time information sent from each of the first base station and a second base station by using a second frequency band; and
a transmitter that notifies the first base station of at least one of the second transmission time information and information about a candidate for the second frequency band that is selected based on the first transmission time information and the second transmission time information and that is simultaneously used with the first frequency band,
the terminal complies with a control signal that is generated based on a propagation delay difference between first propagation delay and second propagation delay in the first base station to perform communication by using a plurality of cells in which uplink transmission timing and downlink reception timing do not overlap with each other.

* * * * *